(12) United States Patent
Simani

(10) Patent No.: US 12,473,190 B2
(45) Date of Patent: Nov. 18, 2025

(54) SYSTEMS METHODS AND COMPUTER READABLE STORAGE MEDIA FOR CONTROLLED WATER FILTERING

(71) Applicant: HADASS FILTRATION SOLUTIONS LTD, Rishon Lezion (IL)

(72) Inventor: Ehud Simani, Neta'im (IL)

(73) Assignee: HADASS FILTRATION SOLUTION LTD, Rishon Lezion (IL)

( * ) Notice: Subject to any disclaimer, the term of this patent is extended or adjusted under 35 U.S.C. 154(b) by 217 days.

(21) Appl. No.: 18/411,702

(22) Filed: Jan. 12, 2024

(65) Prior Publication Data

US 2024/0239645 A1 Jul. 18, 2024

(51) Int. Cl.
- *B67D 1/12* (2006.01)
- *B67D 1/00* (2006.01)
- *B67D 1/08* (2006.01)

(52) U.S. Cl.
CPC ............. *B67D 1/12* (2013.01); *B67D 1/0014* (2013.01); *B67D 1/0895* (2013.01); *B67D 2210/0001* (2013.01)

(58) Field of Classification Search
CPC ...... B67D 1/12; B67D 1/0014; B67D 1/0895; B67D 2210/0001
See application file for complete search history.

(56) References Cited

U.S. PATENT DOCUMENTS

| | | | |
|---|---|---|---|
| 7,672,576 B2 * | 3/2010 | Grossbach | F24H 15/174 392/441 |
| 7,970,264 B2 | 6/2011 | Grossbach et al. | |
| 9,321,623 B2 | 4/2016 | Raoven et al. | |
| 2015/0251922 A1 * | 9/2015 | Schuster | C02F 1/008 210/323.1 |
| 2017/0101325 A1 * | 4/2017 | Ye | E03C 1/0412 |
| 2020/0369532 A1 * | 11/2020 | Wolf | A47L 15/4285 |
| 2022/0098837 A1 * | 3/2022 | Pitsch | E03C 1/0404 |
| 2024/0239645 A1 * | 7/2024 | Simani | B67D 1/12 |

FOREIGN PATENT DOCUMENTS

| | | | | |
|---|---|---|---|---|
| CN | 105233545 B | * | 6/2018 | |
| EP | 3816354 A1 | * | 5/2021 | ............... E03C 1/04 |
| IL | 280665 B | | 3/2022 | |
| JP | 2006516930 A | * | 7/2006 | ................ C02F 9/20 |
| WO | 2013/157007 A1 | | 10/2013 | |
| WO | 2014136109 A1 | | 9/2014 | |

* cited by examiner

*Primary Examiner* — Bob Zadeh
(74) *Attorney, Agent, or Firm* — Patwrite Law; Mark David Torche

(57) ABSTRACT

A system for controlled water filtering including: a water inlet for supplying water from a grid; and a water inlet bifurcator with a filter branch pipe and a bypass branch pipe for collecting unfiltered water. A filtering device is disposed on the filter branch pipe. A water filter valve is connected to the filter branch pipe, and a bypass valve is connected to the bypass branch pipe, for controlling the flow of unfiltered water. A junction element combines the flow of filtered water from the filter branch pipe and the flow of unfiltered water from the bypass branch pipe.

22 Claims, 13 Drawing Sheets

SYSTEMS METHODS AND COMPUTER READABLE STORAGE MEDIA FOR CONTROLLED WATER FILTERING

TECHNICAL FIELD

In general, the present invention pertains to the arts of electromechanics and hydraulics as well as to orthodoxic Halachic laws. In particular, the invention relates to systems methods and computer readable storage media of water filtering compliant with orthodoxic Halachic standards.

BACKGROUND ART

It is believed that the current state of the art is represented by the following patent literature: U.S. Pat. Nos. 7,672,576, 7,970,264, IL225112, IL224166, IL280665 and WO2013157007.

As water dispensers replace the use of tap water almost entirely, some new ergonomic challenges arise. Currently available water dispensers are bulky devices with a water dispensing nozzle usually located above a tray for placing a cup. This layout imposes rigid spatial restrictions and prevents an ergonomic use of the water dispenser when a large cooking vessel or a bucket needs to be filled up with water.

Regardless of the type of dispenser, when a hot water function is provided, it is made by having a hot water reservoir having a heating element for heating the water. The temperature of the water in the hot water reservoir is constantly monitored and, when it drops below a preset level, the heating element is activated to reheat the water. Also, a water valve is provided which adds water to the hot water reservoir when the level drops below a prescribed level. Consequently, when a user fills up a cup with hot water, two things follow: the water valve opens to refill the hot water tank with the amount of water dispensed, the added room-temperature water lowers the temperature of the water in the reservoir, and the heater is activated to reheat the water in the hot water reservoir.

According to the practice of Halachic laws, one may not perform an act of work on the Sabbath. For example, one may not turn on or off the lights on a Sabbath. However, if the light was turned on before the entry of the Sabbath, one may keep the light on and use it the entire Sabbath, provided one does not turn it off before the Sabbath is over. Similarly, one may use hot water if the water heater was energized prior to the entry of the Sabbath, and the water heater is not turned off or on during the Sabbath.

U.S. Pat. Nos. 7,672,576 and 7,970,264 that are believed to represent the closest prior art disclose water dispensers which include a Sabbath function. When activating the Sabbath function, according to U.S. Pat. Nos. 7,672,576 and 7,970,264 water refill of the hot water reservoir tank is prevented and the heating of the water in the hot reservoir tank is modified to provide a constant heating at a less than boiling temperature.

WO2013157007 discloses a water dispenser including: a water entrance connectable to a water supply; a filter unit coupled to said water entrance; a hot water subsystem and a cold water subsystem coupled to said filter unit; a water dispensing nozzle in communication with said hot and cold water subsystems; electrically controlled valves for controlling water flow through said water dispenser; a control unit configured to control said hot and cold water subsystems and said electrically controlled valves; and a manual valve positioned between said water supply and said filter unit, wherein said control unit is configured, in a specified mode of operation, to disable the hot water subsystem and to control the electrically controlled valves such that cold water only flow through said water dispensing nozzle responsive only to manual opening of said manual valve.

IL280665 discloses systems methods and computer readable storage media for controlled water dispensing.

Hence one drawback of current water filtering systems is that they may impose limitations on the use by Halachic laws, which forbid performing work, such as filtering, on Saturdays.

As can be understood, due to the operation of conventional water filtering systems, Sabbath observers and population implementing ultra-orthodoxic Halachic laws cannot use such filtered water during the Sabbath.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The invention was made in view of the deficiencies of the prior art and provides systems, methods and processes for overcoming these deficiencies. According to some embodiments and aspects of the present invention, a system for controlled water filtering includes: a water inlet configured for supplying water from a grid; a bifurcator operationally connected to the water inlet, configured for bifurcating a flow of the water from the inlet, including: a filter branch pipe including at least one filtering device configured for filtering water passing therethrough, the filter branch pipe is configured for collecting unfiltered water from the inlet; a bypass branch pipe configured for collecting unfiltered water from the inlet and supplying filtered; a filtered water valve, operationally connected to the filter branch pipe, configured to control a flow of the filtered water through the filtering device; a bypass valve operationally connected to the bypass branch pipe, configured to control a flow of the unfiltered water through the bypass branch pipe; a junction element disposed downstream to the filter branch pipe and the bypass branch pipe, configured for combining the flow of the filtered water from the filter branch pipe and the flow of the unfiltered water from the bypass branch pipe; a water dispensing appliance operationally connected to the junction element, configured to controllably dispense a flow of water from the junction element.

In some embodiments, the junction element disposed downstream to the filter branch pipe and the bypass branch pipe, is configured for draining the flow of the filtered water from the filter branch pipe, by controllably opening the filtered water valve and closing the bypass valve.

In some embodiments, the junction element disposed downstream to the filter branch pipe and the bypass branch pipe, is configured for draining the flow of the unfiltered water from the bypass branch pipe, by controllably closing the filtered water valve and opening the bypass valve.

In some embodiments, the water dispensing appliance includes at least one nozzle selected from the group consisting of: a daily hot water dispensing nozzle, a Shabbat hot water dispensing nozzle, a cold water dispensing nozzle.

In some embodiments, the system further includes a controller including: a filtering control unit, configured for controlling the flow of the filtered water through the filtering device; a bypass control unit, configured for controlling the flow of the unfiltered water through the bypass branch pipe.

In some embodiments, the filtered water valve and the bypass valve are electromechanical valves.

In some embodiments, the filtered water valve and the bypass valve are functionally actuated via a switch.

According to some embodiments and aspects of the present invention, a system for controlled water filtering includes: a water dispensing appliance configured to controllably dispense a flow of water therefrom, including: a filtered water inlet; an unfiltered water inlet; a filtered water valve, operationally connected to the filtered water inlet, configured to control a flow of filtered water therethrough; a bypass valve, operationally connected to the unfiltered water inlet, configured to control a flow of unfiltered water therethrough; a junction element operationally connected to the filtered water valve and the a bypass valve, configured for combining a flow of filtered water from the filtered water valve and a flow of unfiltered water from bypass valve; a water filtering subsystem, including: a water inlet configured for supplying water from a grid; a bifurcator operationally connected to the water inlet, configured for bifurcating a flow of the water from the inlet, including: a filter branch pipe including at least one filtering device configured for filtering water passing therethrough, the filter branch pipe is configured for collecting unfiltered water from the inlet; a bypass branch pipe configured for collecting unfiltered water from the inlet; a filtered water outlet; an unfiltered water outlet; a filtered water connector, configured to operationally connect the filtered water outlet of the water filtering subsystem to the filtered water inlet of the water dispensing appliance; a unfiltered water connector, configured to operationally connect the unfiltered water outlet of the water filtering subsystem to the unfiltered water inlet of the water dispensing appliance.

In some embodiments, the filtered water valve and the bypass valve are electromechanical valves.

According to some embodiments and aspects of the present invention, a method for controlled water filtering includes: supplying water from a grid to a water inlet; bifurcating a flow of the water from the inlet; collecting by a filter branch pipe unfiltered water from the inlet; filtering water passing through the filter branch pipe by at least one filtering device; collecting by a bypass branch pipe unfiltered water from the inlet; bypassing the at least one filtering device of the filter branch pipe; releasing the filtered water from a filtered water valve; releasing the unfiltered water from a bypass valve; combining by a junction element the flow of the filtered water from the filter branch pipe and the flow of the unfiltered water from the bypass branch pipe; dispensing a flow of water from the junction element to a water dispensing appliance.

In some embodiments, the method further includes combining by a junction element the flow of the filtered water from the filter branch pipe and the flow of the unfiltered water from the bypass branch pipe, further includes combining opening of the filtered water valve and the bypass valve.

In some embodiments, the method further includes supplying by the junction element a flow of the filtered water from the filter branch pipe by controllably opening the filtered water valve and closing the bypass valve.

In some embodiments, the method further includes supplying by the junction element a flow of the unfiltered water from the bypass branch pipe by controllably closing the unfiltered water valve and opening the bypass valve.

In some embodiments, the method further includes controlling by a filtering control unit the flow of the filtered water through the filtering device; controlling by a bypass control unit the flow of the unfiltered water through the bypass branch pipe.

According to some embodiments and aspects of the present invention, a method for controlled water filtering includes: providing a water dispensing appliance configured to controllably dispense a flow of water therefrom, including: a filtered water inlet; an unfiltered water inlet; a filtered water valve, operationally connected to the filtered water inlet, configured to control a flow of filtered water therethrough; a bypass valve, operationally connected to the unfiltered water inlet, configured to control a flow of unfiltered water therethrough; a junction element operationally connected to the filtered water valve and the a bypass valve, configured for combining a flow of filtered water from the filtered water valve and a flow of unfiltered water from bypass valve; providing a water filtering subsystem, including: a water inlet configured for supplying water from a grid; a bifurcator operationally connected to the water inlet, configured for bifurcating a flow of the water from the inlet, including: a filter branch pipe including at least one filtering device configured for filtering water passing therethrough, the filter branch pipe is configured for collecting unfiltered water from the inlet; a bypass branch pipe configured for collecting unfiltered water from the inlet; a filtered water outlet; an unfiltered water outlet; connecting by a filtered water connector the filtered water outlet of the water filtering subsystem to the filtered water inlet of the water dispensing appliance; connecting by an unfiltered water connector the unfiltered water outlet of the water filtering subsystem to the unfiltered water inlet of the water dispensing appliance.

In some embodiments, combining by a junction element the flow of the filtered water from the filter branch pipe and the flow of the unfiltered water from the bypass branch pipe, further includes combining opening of the filtered water valve and the bypass valve.

In some embodiments, the method further includes draining by the junction element a flow of the filtered water from the filter branch pipe by controllably opening the filtered water valve and closing the bypass valve.

In some embodiments, the method further includes draining by the junction element a flow of the unfiltered water from the bypass branch pipe by controllably closing the unfiltered water valve and opening the bypass valve.

In some embodiments, the method includes: controlling by a filtering control unit the flow of the filtered water through the filtering device; controlling by a bypass control unit the flow of the unfiltered water through the bypass branch pipe.

Definitions

The term Orthodoxic Halachic technical standards, as referred to herein, is to be construed as technical standards compliant with standard and traditional interpretation and implementation of Jewish laws, inter alia with standards, guidelines and directives published and certified by the Zomet Institute, where teams of scientists and Torah scholars, research consult and implement Halachic and technology issues.

The term Ultra-Orthodoxic Halachic technical standards, as referred to herein, is to be construed as technical standards compliant with a stricter interpretation of Jewish laws than standard and traditional, inter alia with standards, guidelines and directives published and certified by Badatz Charedi Council of Jerusalem, which is known for its high standards in rabbinical supervision of kosher food and is considered to be one of the strictest certifications in Israel.

The terms matching and/or matchable as referred to herein is to be construed as a cross-sectional area and/or shape of the encasement housing of the modular device of the invention is equal or essentially similar to a cross-sectional area and/or shape of the hot water storage container, so that the encasement is removably installable underneath the hot water storage container. It should be acknowledged that the "encasement housing of the device" and the "hot water storage container" need only to be similar in the cross-sectional areas and/or shapes, to satisfy the term matching/matchable, so long as the cross-sectional areas can be mated and the combined device and hot water storage container will fit into and/or occupy essentially the same lateral space, as the hot water storage container would alone.

The term structured as referred to herein is to be construed as including any geometrical shape, exceeding in complexity a plain linear shape or a shape embodying simple cylindrical, elliptical or polygonal contour or profile. A more complex shape, a plain linear shape or a shape embodying simple cylindrical, elliptical or polygonal contour or profile, constitutes an example of structured geometry.

The term "biasing means" or alike, as referred to herein, should be construed as including any material, structure or mechanism, configured to accumulate mechanical energy, by changing the configuration thereof, upon a force exerted thereon, such as a compressive, tensile, shear or torsional force, and for releasing the energy accumulated therein, by returning to the normal configuration thereof and by performing a mechanical work, typically by linear or radial displacement. Examples of "biasing means" in a non-limiting manner include, springs, elastomers, leaf-springs, coil-springs, tension/extension spring, compression spring torsion spring, constant spring, variable spring, variable stiffness spring, flat spring, machined spring, serpentine spring, garter spring, cantilever spring, helical spring, hollow tubing springs, volute spring, V-spring, belleville washer or belleville spring, constant-force spring, gas spring, mainspring, negator spring, progressive rate coil springs, rubber band, spring washer and wave spring.

The terms water as referred to herein includes any water that is fit for consumption by a living organism (i.e., a living organism may consume the water and thereby maintain a healthy hydration level and/or a living organism may consume the water without the water having a detrimental effect on the organism's health). In certain embodiments the living organism is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some embodiments, the living organism is a human. The term "human" may include human subjects of both genders and at any stage of development (e.g., fetal, neonates, infant, juvenile, adolescent, adult), where in certain embodiments the human subject is a juvenile, adolescent or adult.

The disclosed systems, in certain instances, optionally utilize distilled water. In some embodiments, distilled water is generated by vacuum distillation, which may include boiling of water and collecting the water vapor, having a significantly reduced or eliminated mineral concentration. In some versions, distilled water is generated by multistage flash distillation. In some variations distilled water is generated by reverse osmosis processes. It should be appreciated however that distilled water, as referred to herein, is considered distilled regardless of the nature of the distillation process implemented to produce it, as long as such distilled water has significantly reduced or eliminated mineral content. Moreover, the distilled water is typically has significantly reduced or eliminated non-mineral, such as metal ions, heavy metals, organic molecules, etc.

In certain embodiments, distillation of the disclosed systems utilizes reverse osmosis. In some aspects, reverse osmosis implements pressure and/or one or more semipermeable membranes. In certain versions of reverse osmosis, water is passed through one or more semipermeable membranes in order to remove salt and/or minerals and/or other impurities therefrom.

The term heat pump as referred to herein is to be construed as including any device that transfers heat energy from a heat source to a heat sink, in the opposite direction of spontaneous heat transfer, by absorbing heat from a cold space and releasing it to a warmer one. A heat pump uses external power to accomplish the work of transferring energy from the heat source to the heat sink. The most common design of a heat pump involves four main components: a condenser, an expansion valve, an evaporator and a compressor, used to circulate the heat transfer medium called refrigerant through these components.

The term printed circuit board and/or acronym PCB, as referred to herein, should be construed as encompassing any type of a circuit board, not intended to limit to any particular board type or production technique, including inter alia non-printed circuit boards. device. The term printed circuit board and/or acronym PCB particularly include any type of structure configured to mechanically support and/or electrically connect electric and electronic components, such as: Printed Wire Boards (PWB), Printed Circuit Assemblies (PCA), Printed Circuit Board Assemblies (PCBA), Circuit Card Assemblies (CCA), Flexible Circuit Boards (FCB), integrated circuits (IC), monolithic integrated circuits (often referred to as a chips or microchips), chipsets and etc. The term printed circuit board and/or acronym PCB optionally include embedded software, written to control machines or devices that are not typical computers. Embedded software is specialized for the particular hardware and sometimes used interchangeably with the term firmware. A characteristic of embedded software is that no or at least not all functions thereof are initiated and/or controlled via a human interface but rather through machine-interfaces instead.

The term controller unit and/or microcontroller unit and/or acronym MCU, as referred to herein, should be construed as encompassing any type of a small computer on a single integrated circuit. MCU is typically similar to, but less sophisticated than, a system on a chip (SoC); an SoC may include a microcontroller as one of its components. An MCU contains one or more CPUs (processor cores) along with memory and programmable input/output peripherals. Program memory in the form of ferroelectric RAM, NOR flash or OTP ROM is also often included on chip, as well as a small amount of RAM. MCUs are designed for embedded applications, in contrast to the microprocessors used in personal computers or other general-purpose applications consisting of various discrete chips.

Whenever the terms "server", "agent", "system" or "module" is used herein, it should be construed as a computer program, including any portion or alternative thereof, e.g. script, command, application programing interface (API), graphical user interface (GUI), etc., and/or computational hardware components, such as logic devices and application integrated circuits, computer storage media, computer micro-processors and random access memory (RAM), a display, input devices and networking terminals, including configurations, assemblies or sub-assemblies thereof, as well as any combination of the former with the latter.

The term storage as referred to herein is to be construed as including one or more of volatile or non-volatile memory, hard drives, flash storage devices and/or optical storage devices, e.g. CDs, DVDs, etc. The term "computer-readable media" as referred to herein can include transitory and non-transitory computer-readable instructions, whereas the term "computer-readable storage media" includes only non-transitory readable storage media and excludes any transitory instructions or signals. The terms "computer-readable media" and "computer-readable storage media" encompass only a computer-readable media that can be considered a manufacture (i.e., article of manufacture) or a machine. Computer-readable storage media includes "computer-readable storage devices". Examples of computer-readable storage devices include volatile storage media, such as RAM, and non-volatile storage media, such as hard drives, optical discs, and flash memory, among others.

The term network, as referred to herein, should be understood as encompassing any type of computer and/or data network, in a non-limiting manner including one or more intranets, extranets, local area networks (LAN), wide area networks (WAN), wireless networks (WIFI), the Internet, including the world wide web, and/or other arrangements for enabling communication between the computing devices, whether in real time or otherwise, e.g., via time shifting, cashing, batch processing, etc.

The terms notification and/or message as used herein refer to a communication provided by a notification system to a message recipient device. A notification and/or message may be used to inform one or more recipient device, for example a notification and/or messages may be provided to the one or more recipient device, in a non-limiting manner using SMS texts, MMS texts, E-mail, Instant Messages, mobile device push notifications, HTTP requests, voice calls, telephone calls, Voice Over IP (VOIP) calls or alike, library function calls, API calls, URLs as well as any signals transferred, transmitted or relayed, as defined herein or any combination thereof.

The term "Internet of Things" or "IoT" may be used by those in the network field to refer to uniquely identifiable objects (things) and their virtual representations in a network-based architecture. In particular, as used herein, the term "IoT module" may refer to a computing device that has a particular intended functionality not of only connecting to computers and other network communicable devices, but also the ability to connect "objects" in general, such as lights, appliances, HVAC (heating, ventilating, and air-conditioning), windows, window shades, and blinds, doors, locks, etc.

By "operationally connected" and "operably coupled", as used herein, is meant connected in a specific way (e.g., in a manner allowing water to move and/or electric power to be transmitted) that allows the disclosed system and its various components to operate effectively in the manner described herein.

Whenever in the specification hereunder and particularly in the claims appended hereto a verb, whether in base form or any tense, a gerund or present participle or a past participle are used, such terms as well as preferably other terms are to be construed as actual or constructive, meaning inter alia as being merely optionally or potentially performed and/or being only performed anytime in future. The terms essentially and substantially, or similar relative terms, are to be construed in accordance with their ordinary dictionary meaning, namely mostly but not completely.

The term "substantially" as used herein is a broad term, and is to be given its ordinary and customary meaning to a person of ordinary skill in the art (and is not to be limited to a special or customized meaning), and refers without limitation to being largely but not necessarily wholly that which is specified.

As used herein, the term "essentially" changes a specific meaning, meaning an interval of plus or minus ten percent (±10%). For any embodiments disclosed herein, any disclosure of a particular value, in some alternative embodiments, is to be understood as disclosing an interval approximately or about equal to that particular value (i.e., 10%).

The term "essentially" further means that the composition, method or structure may include additional ingredients, stages and or parts, but only if the additional ingredients, the stages and/or the parts do not materially alter the basic and new characteristics of the composition, method or structure claimed.

As used herein, the term "about" or "approximately" modifies a particular value, by referring to a range equal to the particular value, plus or minus twenty percent (+/−20%). For any of the embodiments, disclosed herein, any disclosure of a particular value, can, in various alternate embodiments, also be understood as a disclosure of a range equal to about that particular value (i.e. +/−20%).

As used herein, the term "or" is an inclusive "or" operator, equivalent to the term "and/or," unless the context clearly dictates otherwise; whereas the term "and" as used herein is also the alternative operator equivalent to the term "and/or," unless the context clearly dictates otherwise.

It should be understood, however, that neither the briefly synopsized summary nor particular definitions hereinabove are not to limit interpretation of the invention to the specific forms and examples but rather on the contrary are to cover all modifications, equivalents and alternatives falling within the scope of the invention.

DESCRIPTION OF THE DRAWINGS

The present invention will be understood and appreciated more comprehensively from the following detailed description taken in conjunction with the appended drawings in which.

Figure 1:
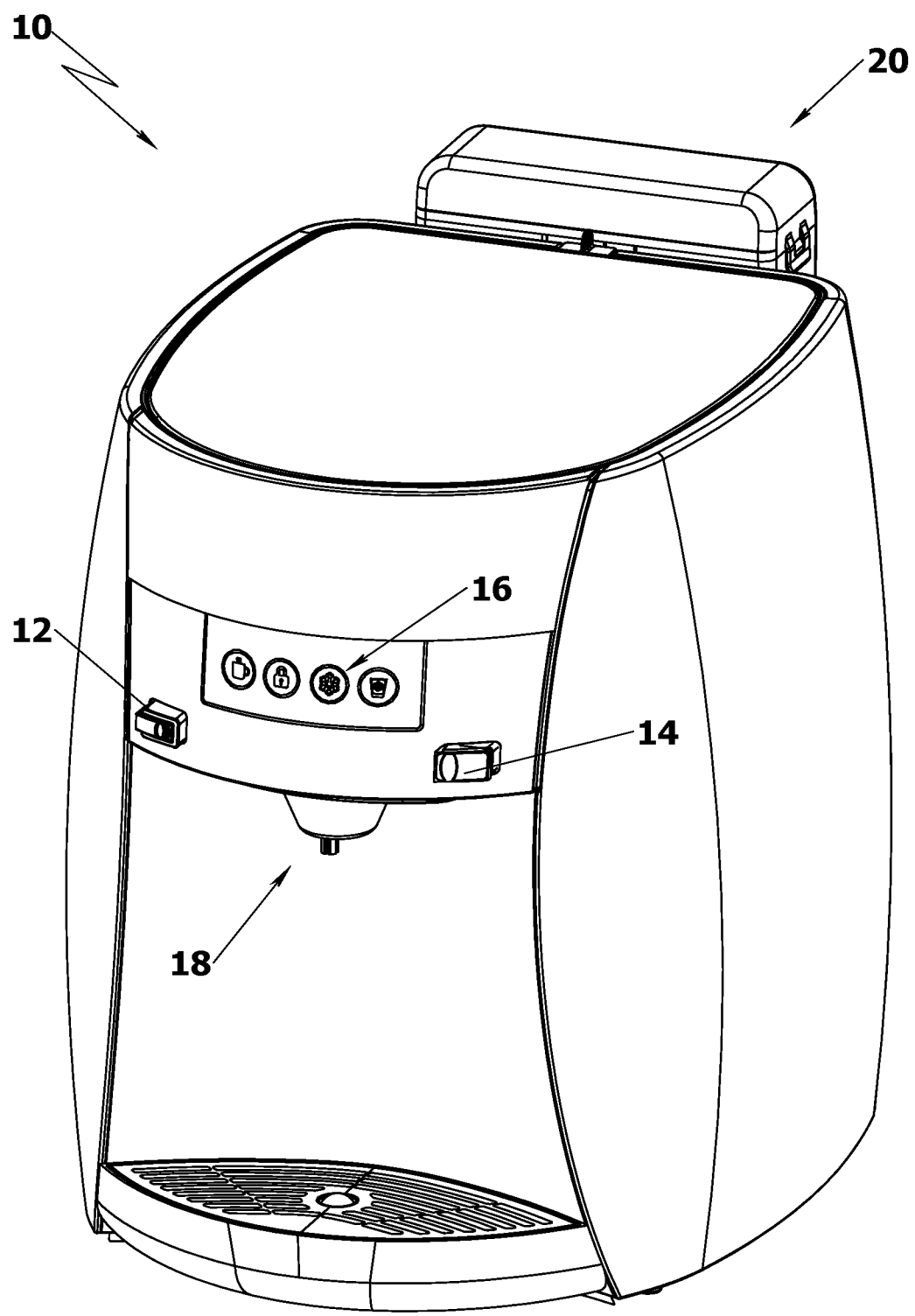
FIG. 1 is a prior art illustration from IL280665 of an isometric view of a water dispensing appliance, compliant with orthodoxic Halachic standards.
Figure 2:
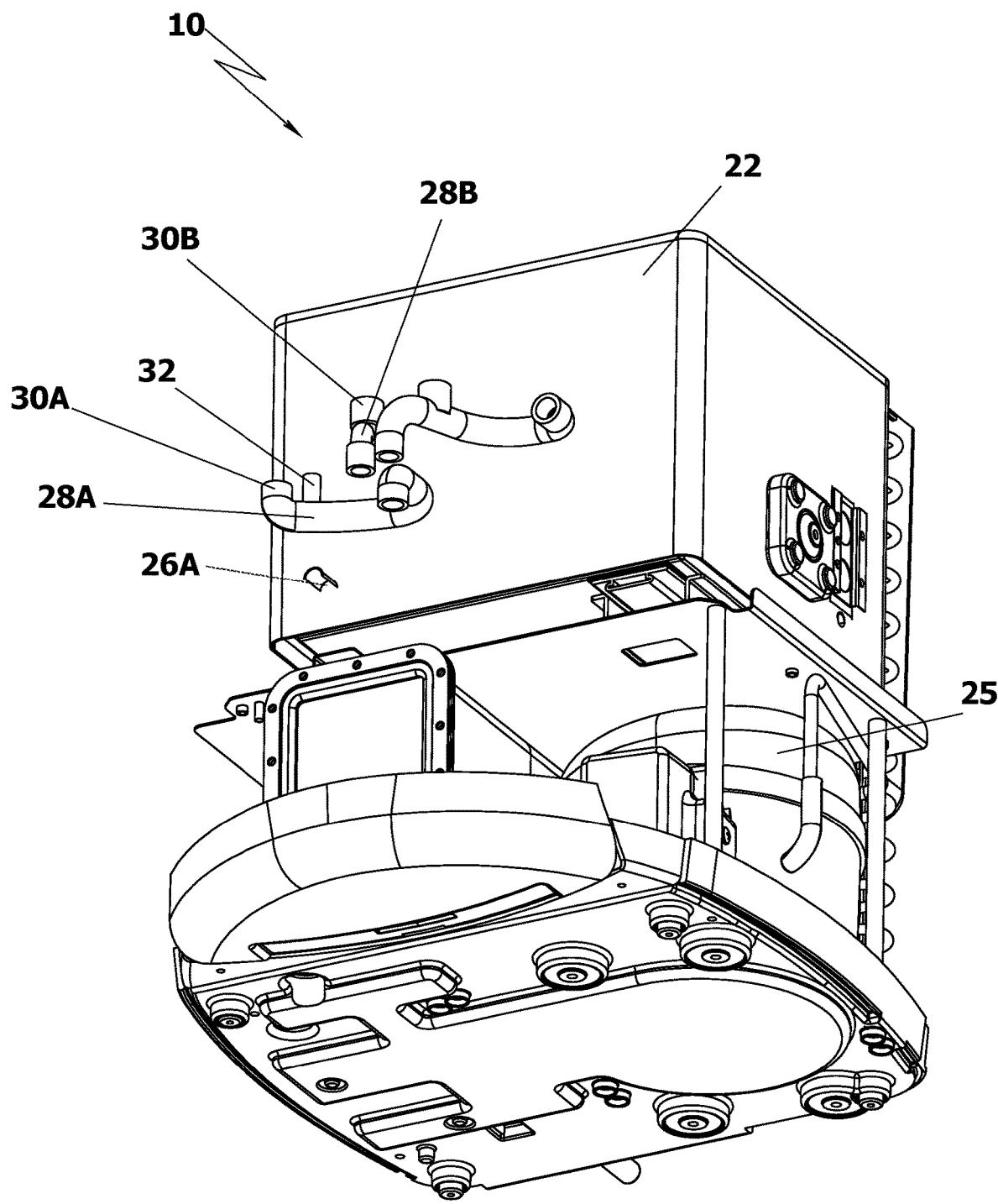
FIG. 2 is a prior art illustration from IL280665 of a bottom perspective view of the water dispensing appliance.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DISCLOSURE OF EMBODIMENTS

Prior to elaborating any embodiment of the present invention, in order to present the background for the inventive concept more clearly, reference is firstly made to FIG. 1 to 5, showing a water dispensing appliance with orthodoxic Halachic standards, shown in FIGS. 1 to 5 of IL280665. Prior art water dispensing appliance 10 with orthodoxic Halachic standards, shown in FIG. 1 to 5, known from IL280665, is operable in a daily operational mode and a Sabbath operational mode. The "Sabbath operational mode" is meant to include operation during both the Jewish Sabbath when the actuation of electrical devices and the heating and/or reheating of water is forbidden, but not necessarily during a non-Sabbath Jewish holidays mode, when the actuation of electrical devices is forbidden but the heating of water may be permissible. The "near to scalding temperature" is a threshold temperature defined by Jewish authorities to which unheated water is forbidden to be heated on the Sabbath.

In some embodiments, water dispensing appliance 10 comprises two electric taps (not shown), actuated via panel 16. The electric taps (not shown) actuated via panel 16 are intended for operating during the daily operating mode. At least one electric tap (not shown) is configured for serving hot water whereas at least one an electric tap actuated via panel 16 is configured for serving cold water during the daily operating mode.

In some embodiments, water dispensing appliance 10 comprises hot water mechanical tap 12. Hot water mechanical tap 12 is configured for serving hot water during Shabbat operational mode. In some embodiments, water dispensing appliance 10 comprises cold water mechanical tap 14. Cold water mechanical tap 14 is configured for serving cold water during Shabbat operational mode. In some embodiments, panel 16 of water dispensing appliance 10 comprises a recharge button (not shown), configured for manually actuating the replenishing of the hot water reservoir.

In some embodiments, water dispensing appliance 10 comprises water outlet nozzles complex 18 through which hot water as well as cold water is dispensable. Water outlet nozzle complex 18 is in communication with hot water subsystem and cold water subsystem. In some embodiments, water dispensing appliance 10 further includes gravitational tank 20. Gravitational tank 20 is configured for creating gravity water pressure for cold water reservoir.

In some embodiments, reference is now made to FIG. 2 to 5, showing water dispensing appliance 10. In some embodiments, water dispensing appliance 10 comprises a hot water subsystem. The hot water subsystem of dispensing appliance 10 includes hot water reservoir 22. Hot water reservoir 22 of dispensing appliance 10 comprises heaters, typically electrical, and temperature sensor, configured to control the heating of water in hot water reservoir 22. Hot water reservoir 22 of dispensing appliance 10 comprises preferably comprises hot water overflow outlet 24, shown in FIG. 3. In some embodiments, dispensing appliance 10 comprises gravitational tank 20. When hot water in reservoir 22 exceeds the level of overflow outlet 24, excessive hot water is discharged from hot water reservoir 22 via overflow outlet 24, shown in FIG. 3, into gravitational tank 20, of dispensing appliance 10.

Hot water reservoir 22 is thermally insulated and configured for storing hot water. Hot water reservoir 22 comprises outlet 26A. Outlet 26A operationally connects hot water reservoir 22 to hot water mechanical tap 12 operational during the Shabbat operational mode. Outlet 26A is disposed inasmuch closer to hot water mechanical tap 12 so that the conduit conducting hot water from hot water reservoir 22 to mechanical tap 12 is inasmuch sorter, whereby inasmuch minuscular amounts of residual water remain outside hot water reservoir 22 in the conduit between outlet 26A and mechanical tap 12 during the Shabbat operational mode, thereby maintaining the same temperature between hot water reservoir 22 and hot water mechanical tap 12.

In fact, if the conduit from hot water reservoir 22 to mechanical tap 12 was longer, excess water would remain in the conduit and would cool down. If the user would open mechanical tap 12 again, the hot water in the conduit would have a cooking effect on the cooled water, which represents a prohibited work during Shabbat. Short connection and dedicated conduit, from the hot reservoir 22 to the mechanical tap 12, facilitating the maintaining of essentially the same temperature of the residual water in the conduit as in the hot reservoir 22.

Jewish law prohibits the heating of liquids on the Shabbat beyond a threshold temperature of about 40° C., such heating being defined as cooking, which is proscribed on the Shabbat. On the other hand, heating water on the Shabbat to a temperature that is less than 40° C. is permitted. Complementary to this restriction, water may be heated to a much higher temperature, say close to 100° C. before the onset of the Shabbat and the high temperature (way above 40° C.) may be maintained on the Shabbat.

In some embodiments, hot water subsystem of water dispensing appliance 10 further comprises Shabbat hot water dispensing nozzle 28A. Shabbat hot water dispensing nozzle 28A is operationally connected to outlet 26A by a tube or pipe (not shown). Shabbat hot water dispensing nozzle 28A is configured for dispensing hot water from hot water mechanical tap 12, shown in FIG. 1, during Shabbat operational mode. In some embodiments, Shabbat hot water dispensing nozzle 28A includes hot water inlet 30A configured to enter hot water from hot water mechanical tap 12 to Shabbat hot water dispensing nozzle 28A.

In some embodiments, hot water subsystem of water dispensing appliance 10 further includes ventilation unit 32. Ventilation unit 32 is configured to aerate Shabbat hot water dispensing nozzle 28A. Ventilation unit 32 allows air to enter into Shabbat hot water dispensing nozzle 28A and is configured for draining during Shabbat the residual water from hot water dispensing nozzle 28A, downstream to hot water mechanical tap 12.

Figure 3:
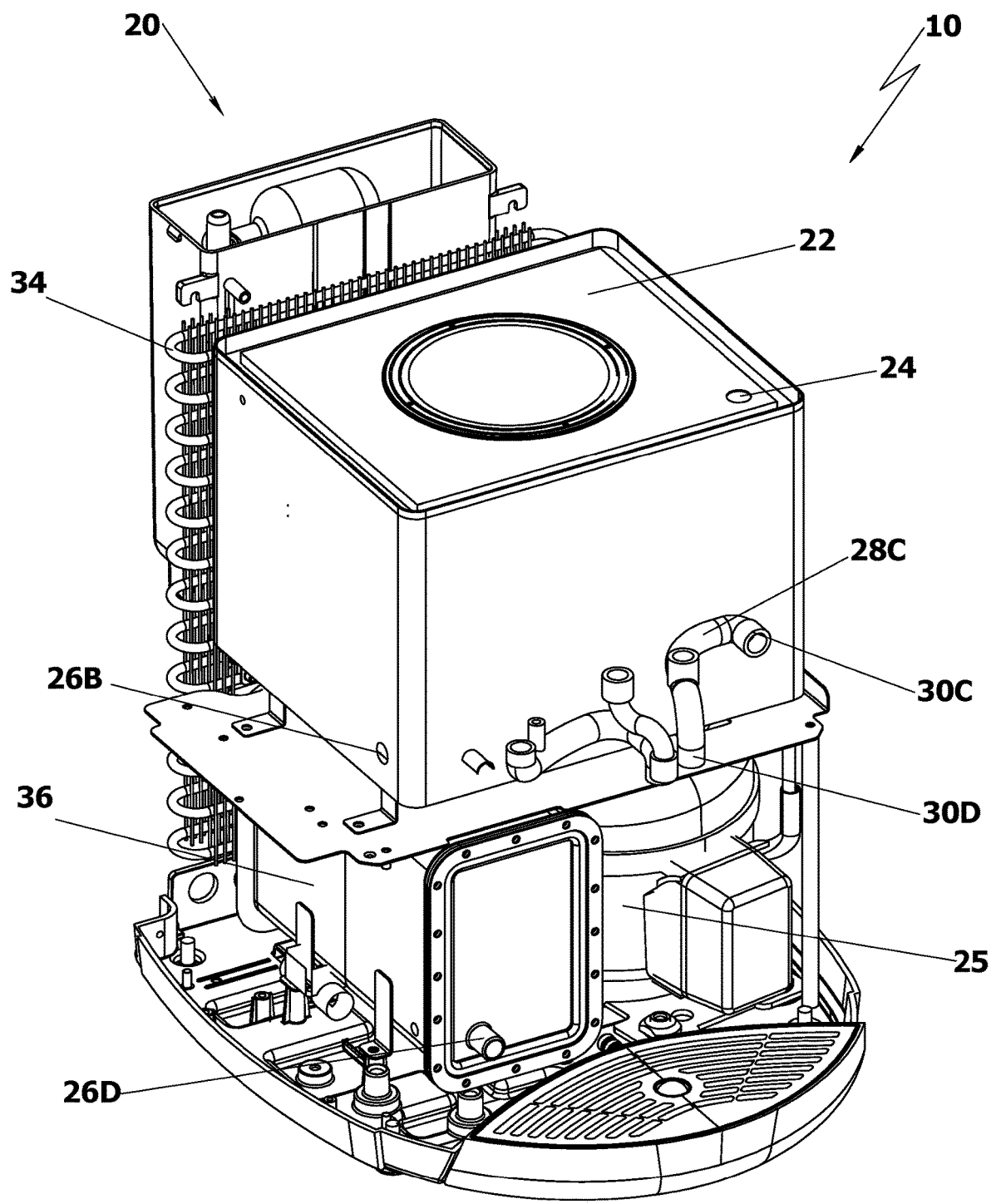
FIG. 3 is a prior art illustration from IL280665 of a front perspective view of the water dispensing appliance.

In some embodiments, hot water subsystem comprises outlet 26B, shown in FIG. 3. Outlet 26B is operationally connected to hot water reservoir 22. Outlet 26B is configured for releasing hot water from hot water reservoir 22 to hot water electrical tap, as shown in FIG. 1, operable during the daily operational mode.

In some embodiments, hot water subsystem of water dispensing appliance 10 further comprises daily hot water dispensing nozzle 28B. Inlet 30B of daily hot water dispensing nozzle 28B is operationally connected to hot water electrical tap, as shown in FIG. 1, via a pipe or tube. Daily hot water dispensing nozzle 28B is configured for dispensing hot water from hot water electrical tap, shown in FIG. 1, during the daily operational mode. In some embodiments, hot water subsystem of water dispensing appliance 10 includes hot water inlet 30B configured to enter hot water from hot water electrical tap, as shown in FIG. 1, to daily hot water dispensing nozzle 28B.

In some embodiments, daily hot water dispensing nozzle 28B, which is connected to outlet 26B of hot water reservoir 22, via hot water electrical tap, as shown in FIG. 1, is typically intended for dispensing hot water via the hot water electrical tap, as shown in FIG. 1, during the daily operational mode. In fact, during the daily operational mode, the excess hot water present in daily hot water dispensing nozzle 28B after closing the hot water electrical tap, as shown in FIG. 1, can be cooled because cooking is not prohibited during the week.

In some embodiments, a controller module commands operation of the various electrical components of water dispensing appliance 10 during both the daily operational mode and the Sabbath operational mode. In some embodiments, a selectable mechanism, such is in a form of a switch or button, is provided so as to activate the Sabbath mode, preventing dispensing hot water from daily hot water dispensing nozzle 28B during the Sabbath. When the selectable mechanism is actuated, dispensing of hot water is prevented by, for example, disabling the hot water electrical tap, as shown in FIG. 1, which controls the flow from outlet 26B of hot water reservoir 22.

In some embodiments, reference is now made to FIG. 3, showing a front isometric view of water dispensing appliance 10. To ensure that a consumer will receive hot water upon demand, the controller module may be operable that water level within hot water reservoir 22 will fill to a maximum height upon initiation of the Sabbath operational mode.

Figure 4:
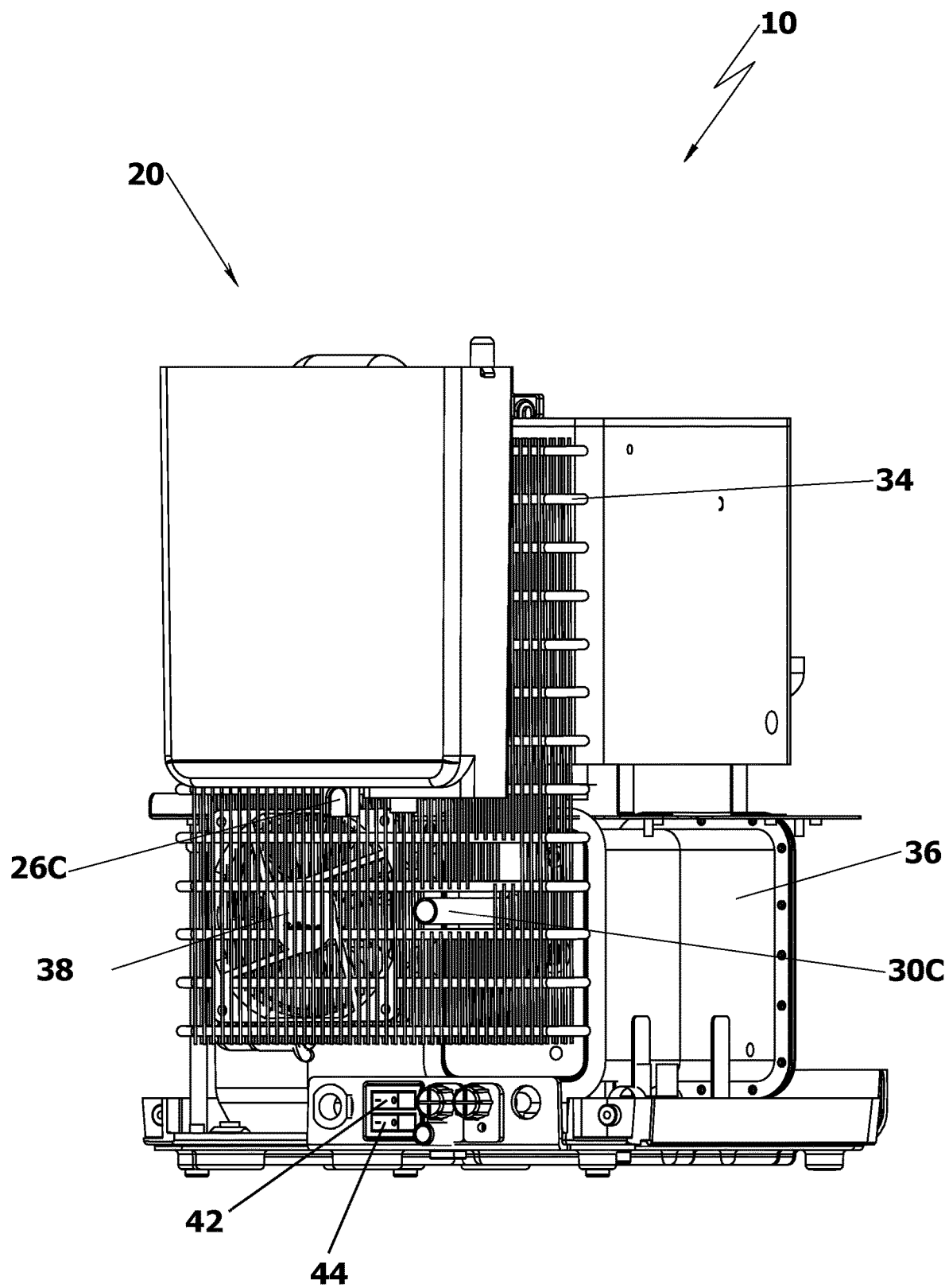
FIG. 4 is a prior art illustration from IL280665 of a back perspective view of the water dispensing appliance.

In some embodiments, reference is now made to FIG. 4, showing a back isometric view of water dispensing appliance 10. As shown in FIG. 4, water dispensing appliance 10 comprises a cold water subsystem. The cold water subsystem comprises cold water reservoir 36. Cold water reservoir 36 is configured for storing cold water. In some embodiments, cold water reservoir 36 is connected to gravitational tank 20. Water leaves gravitational tank 20 via outlet 26C and enters in cold water reservoir via inlet 30C.

In some embodiments, cold water reservoir 36 is provided with a cooling element, which cools the water to a desired temperature. In some examples, the chilling element is the evaporator of the heat pump. In some embodiments, the hot water subsystem is operated by button 42. In some embodiments, the cold water subsystem is operated by button 44. In some embodiments, button 42 is configured for activating the Shabbat operational mode, whereas button 44 is configured for turning on and turning off dispensing appliance 10.

Figure 5:
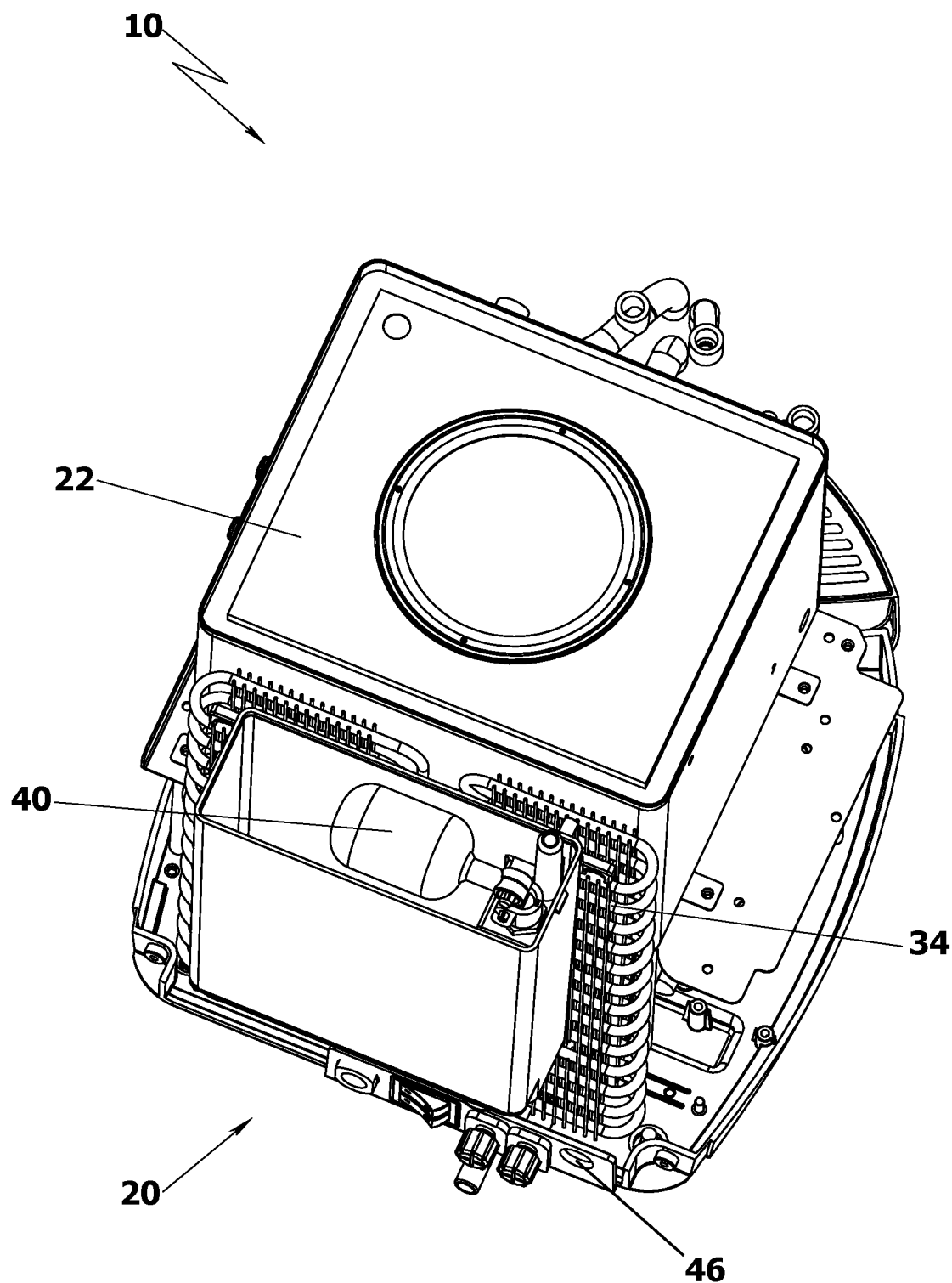
FIG. 5 is a prior art illustration from IL280665 of a top perspective view of the water dispensing appliance.

In some embodiments, reference is now made to FIG. 5, showing a top isometric view of water dispensing appliance 10. In some embodiments, gravitational tank 20 further comprises float valve 40. Float valve 40 is operable to refill gravitational tank 20, which in turn refills or replenishes cold water reservoir 36 whenever water is drawn from cold water reservoir 36.

In some embodiments, water dispensing appliance 10 further comprises grid water inlet 46. Water inlet 46 is typically connected to an electric and/or mechanic inlet valve (not shown) operable to control flow of water from water inlet 46 to hot water reservoir 22 as well as gravitational tank 20. In some embodiments, water dispensing appliance 10 includes a controller operable in a Sabbath operational mode to turn off water valve to prevent water flow from water inlet 46 to hot water reservoir 22 and to operate the heaters in a constant-on operational mode. Water inlet 46 is typically comprises a manifold bifurcating the input flow from water inlet 46 to two electric and/or mechanic inlet valves (not shown), operable to control the flow of water from water inlet 46 and/or to replenish hot water reservoir 22 as well as gravitational tank 20.

In some embodiments, hot water reservoir 22 comprises a level monitoring device, such as an interruptible electric conductivity circuit, and upon dropping below a predefined level, water reservoir 22 is replenished from an inlet, such as inlet/outlet 24, shown in FIG. 3, connected to an electric and/or mechanic inlet valve (not shown), operable to control the flow of water from water inlet 46. In some embodiments, gravitational tank 20 comprises a level monitoring device, such as float valve 40, and upon dropping below a predefined level, gravitational tank 20 is replenished from an inlet, connected to an electric and/or mechanic inlet valve, such as float valve 40, operable to control the flow of water from water inlet 46.

It is noted that all the dispensing of water by water dispensing appliance 10, whether from hot water reservoir 22 or from cold water reservoir 36 is performed by a gradational flow. Accordingly, both the hot water subsystem and the cold water subsystem are not under a significant water grid pressure of several bars, which contributes to the durability and longevity of water dispensing appliance 10.

The level of water in hot water reservoir 22 is substantially higher than the level of daily hot water nozzle 28B and/or of Shabbat hot water nozzle 28A, so that the hot water is spontaneously pouring from hot water reservoir 22, upon opening the electrical valve during the daily operational mode and/or the mechanical tap during the Shabbat operational mode. The level of water in gravitational tank 20, which replenishing cold water reservoir 36, is substantially higher than the level of cold water nozzle 28C, so that the hot water is spontaneously pouring from cold water reservoir 36, upon opening the electrical valve during the daily operational mode and/or the mechanical tap during the Shabbat operational mode.

Illustrative embodiments of the invention are described below. In the interest of clarity, not all features of actual implementation are described in this specification. It should be appreciated that various features or elements described in the context of some embodiment may be interchangeable with features or elements of any other embodiment described in the specification. Moreover, it will be appreciated that for the development of any actual embodiment, numerous implementation-specific decisions must be made to achieve the developers' specific goals, such as compliance with technology- or business-related constraints, which may vary from one implementation to another, and the effort of such a development might be complex and time-consuming, but would nevertheless be a routine undertaking for those of ordinary skill in the art having the benefit of this disclosure.

Figure 6:
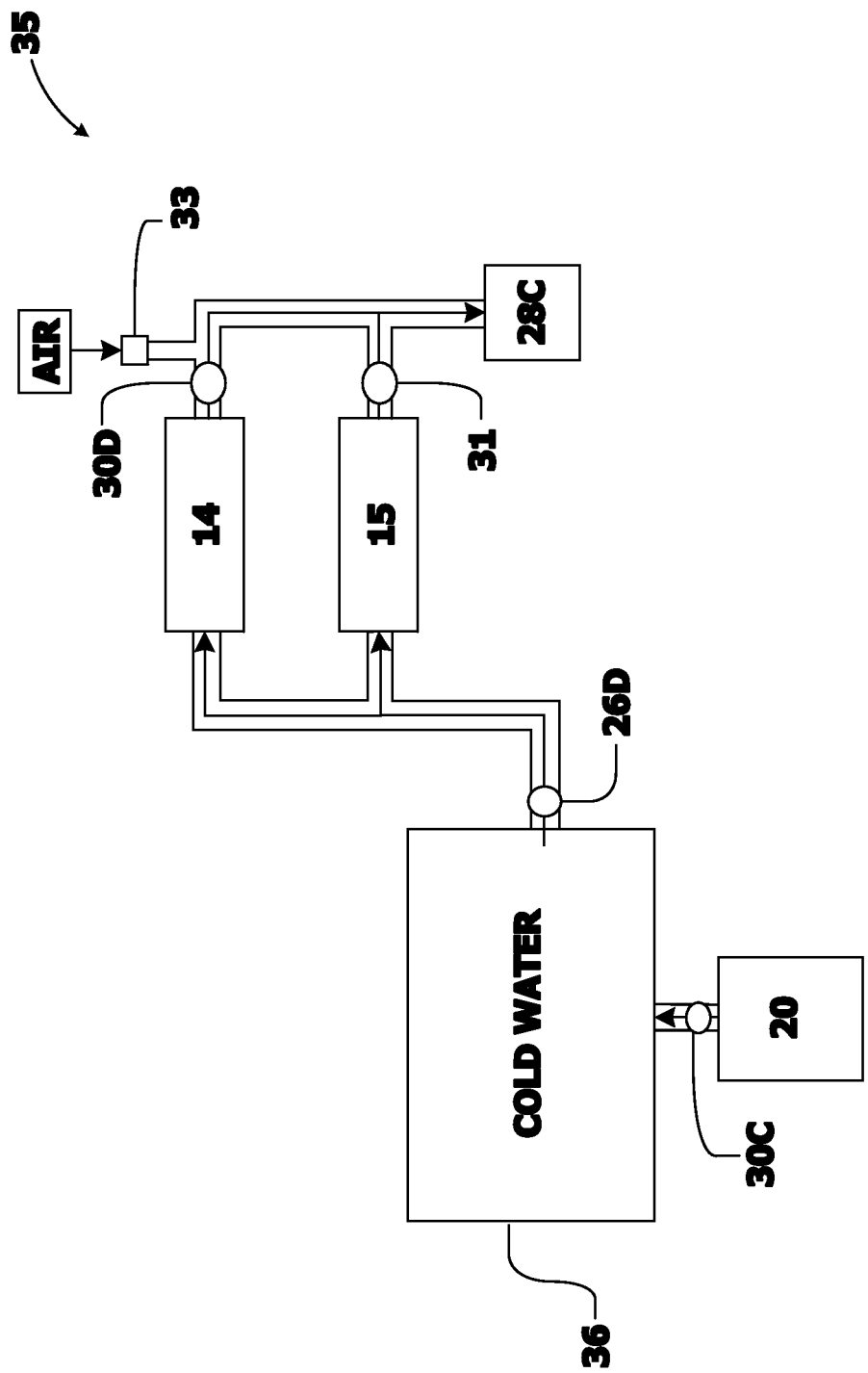
FIG. 6 is a prior art illustration from IL280665 of a block diagram of a cold water subsystem of the water dispensing appliance, according to some embodiments of the present invention.

Reference is now made to FIG. 6, showing a block diagram of cold water subsystem 35 of water dispensing appliance, such as appliance 10 shown in FIG. 1 to 5. Cold water subsystem 35 comprises cold water reservoir 36. In some embodiments, cold water subsystem 35 of the water dispensing appliance further comprises a heat pump. In some examples, heat pump may be any device that transfers heat energy from a heat source to a heat sink, in the opposite direction of spontaneous heat transfer, by absorbing heat from a cold space and releasing it. An exemplary heat pump includes four main components: condenser 34 shown in FIG. 3, which may be furnished with coiling ribs 38 shown in FIG. 4, an expansion valve, evaporator and compressor, such as compressor 25 shown in FIGS. 2 and 3, used to circulate the heat transfer medium called refrigerant through these components.

Cold water reservoir 36 is thermally insulated and configured for storing cold water. In some embodiments, cold water subsystem 35 of the water dispensing appliance, such as appliance 10 shown in FIG. 1 to 5, comprises outlet 26D. Outlet 26D is operationally connected to cold water reservoir 36. Outlet 26D is configured for releasing cold water from cold water reservoir 36 to cold water mechanical tap 14, operational during the Shabbat operational mode, as well as to cold water electrical tap 15, operational during the daily operational mode. Therefore the conduit connected to outlet 26D comprises a manifold configured to bifurcate the flow form outlet 26D of cold water reservoir 36 to cold water electric tap 15 and the cold water mechanical tap 14, such as electric tap 15 and mechanical tap 14 shown in FIG. 1.

In some embodiments, cold water subsystem 35 of water the dispensing appliance, such as appliance 10 shown in FIG. 1 to 5, includes cold water inlet 30C. Cold water inlet 30C is configured to enter cold water into cold water reservoir 36, preferably from gravitational tank 20. Cold water inlet 30C of cold water reservoir 36 is configured to conduct cold water from gravitational tank 20 typically during the Shabbat operational mode and daily operational mode.

In some embodiments, cold water subsystem 35 of water dispensing appliance, such as appliance 10 shown in FIG. 1 to 5, further comprises cold water dispensing nozzle 28C. Cold water dispensing nozzle 28C is operationally connected to cold water electric tap 15 and cold water mechanical tap 14, via a pipe or tube. Cold water dispensing nozzle 28C is configured for dispensing cold water from mechanical tap 14, during Shabbat operational mode, as well as from cold water electrical tap 15, during the daily operational mode.

In some embodiments, cold water dispensing nozzle 28C of cold water subsystem 35 of water dispensing appliance, such as appliance 10 shown in FIG. 1 to 5, includes cold water inlets 30D and 31. Cold water inlet 30D is configured to enter cold water from cold water mechanical tap 14 during Shabbat operational mode, whereas 31 is configured to enter cold water from cold water electrical tap, during the daily operational mode.

In some embodiments, cold water subsystem 35 of water dispensing appliance, such as appliance 10 shown in FIG. 1 to 5, further includes ventilation unit 33. Ventilation unit 33 is configured to aerate cold water dispensing nozzle 28C. Ventilation unit 33 allows air to enter into cold water dispensing nozzle 28C and is configured for draining during Shabbat the residual water from cold water dispensing nozzle 28C, downstream to cold water mechanical tap 14.

Figure 7:
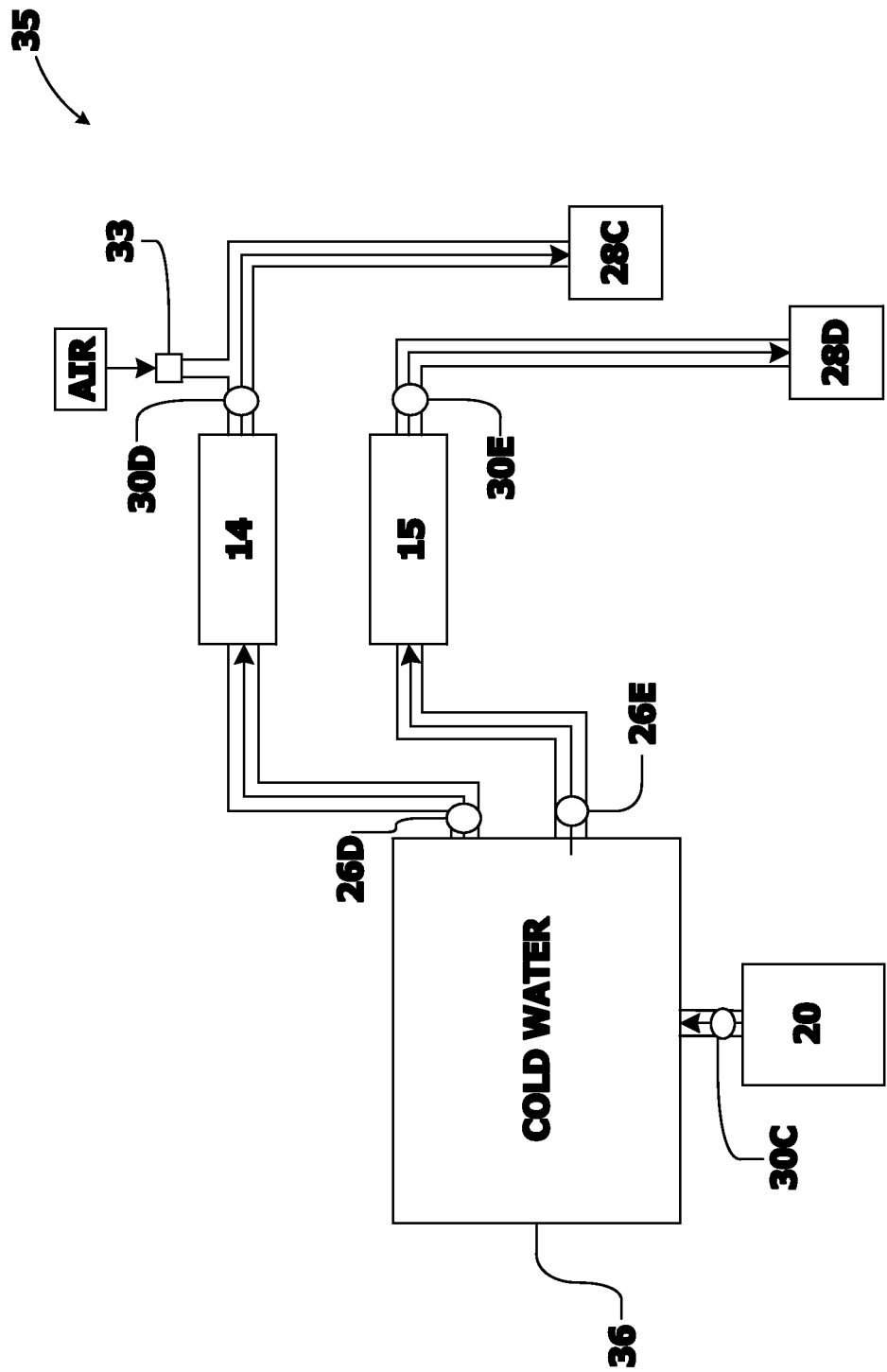
FIG. 7 is a block diagram of a cold water subsystem of the water dispensing appliance, according to another embodiment of the present invention.

Referring now to FIG. 7, additionally to FIG. 6, showing other embodiments of cold water subsystem 35 comprising outlet 26E. Outlet 26E is operationally connected to cold water reservoir 36. Outlet 26E is configured for releasing cold water from cold water reservoir 36 to cold water electrical tap 15, operable during the daily operational mode.

In some embodiments, cold water subsystem 35 of water dispensing appliance 10 further comprises daily cold water dispensing nozzle 28D. In some embodiments, cold water subsystem 35 of water dispensing appliance 10 includes an inlet of daily cold water dispensing nozzle 28D operationally connected to cold water electrical tap 15, via a pipe or tube. The inlet of daily cold water dispensing nozzle 28D is configured to enter cold water from cold water electrical tap 15, to daily cold water dispensing nozzle 28D. Daily cold water dispensing nozzle 28D is configured for dispensing cold water from cold water electrical tap 15, during the daily operational mode.

In some embodiments, daily cold water dispensing nozzle 28D, which is connected to outlet 26E of hot water reservoir 36, via cold water electrical tap 15, is configured for dispensing cold water via cold water electrical tap 15, during the daily operational mode. During the daily operational mode, the excess water present in daily cold water dispensing nozzle 28D, after closing cold water electrical tap 15, can be warmed because cooking is not prohibited during the week.

In some embodiments, a controller module commands operation of the various electrical components of water dispensing appliance 10 during both the daily operational mode and the Sabbath operational mode. In some embodiments, a selectable mechanism, such is in a form of a switch or button, is provided so as to activate the Sabbath mode, preventing dispensing cold water from daily cold water dispensing nozzle 28D and/or via cold water electrical tap 15 during the Sabbath. When the selectable mechanism is actuated, dispensing of cold water is prevented by, for example, disabling cold water electrical tap 15, which controls the flow from outlet 26E of cold water reservoir 36.

Figure 8:
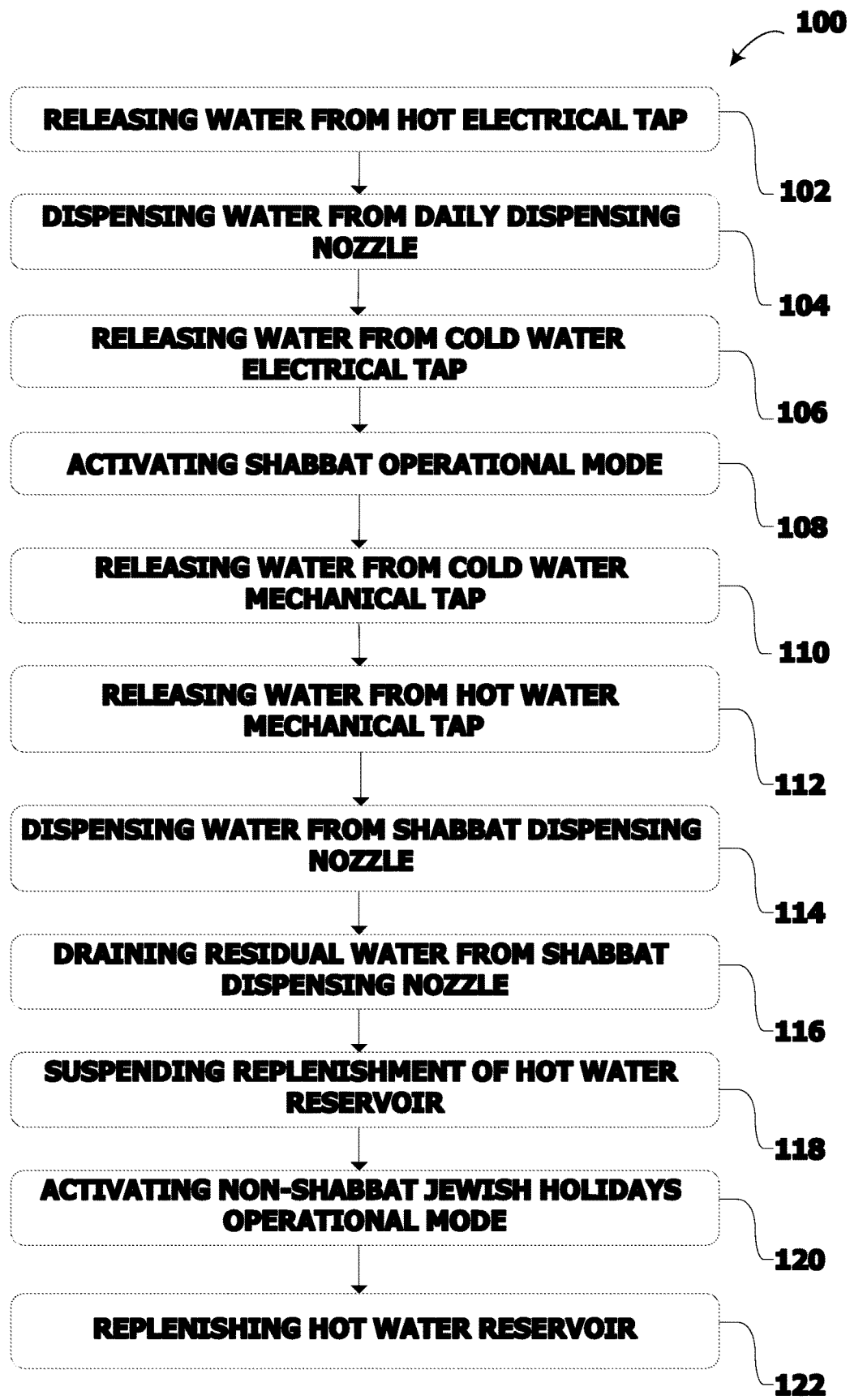
FIG. 8 is a flowchart of the method of the water dispensing compliant.

In accordance with some embodiments, reference is now made to FIG. 8, showing a flowchart of method 100 of the water dispensing compliant. The embodiment of method 100 shown in FIG. 8 illustrates various features that may be interchangeable with elements and/or features of any other embodiment described in the specification.

In some embodiments, method 100 commences at step 102 of releasing hot water, from the hot water from, towards the hot electrical tap, during the daily operational mode. In some examples, method 100 is achievable by constantly heating the water in the hot water reservoir to near boiling temperature, or to re-boiling the water in the hot water reservoir. Method 100 typically, further comprises step 104 of dispensing hot water downstream to hot electrical tap, via a daily hot water dispensing nozzle, during the daily operational mode.

In some embodiments, method 100 includes step 106 of releasing cold water from a cold water reservoir to a cold water electrical tap and then dispensing cold water from cold water dispensing nozzle, during the daily operational mode. In some examples, step 106 is achievable by constantly cooling the water at a desired temperature by cooling elements.

In some embodiments, method 100 includes step 108 of activating the Shabbat operational mode, which disables the daily operational mode. In some examples, step 108 is achievable by a selectable mechanism, preventing dispensing hot water via electric valve and/or from daily hot water dispensing nozzle during the Shabbat.

In some embodiments, method 100 further comprises step 110 of dispensing cold water from a cold water reservoir, to a cold water mechanical tap and then dispensing the cold water from the cold water dispensing nozzle, during the Shabbat operational mode.

In some embodiments, method 100 comprises step 112 of releasing hot water from hot water reservoir, via a mechanical tap, during Shabbat operational mode. In some embodiments, method 100 includes step 114 of dispensing hot water from the Shabbat hot water dispensing nozzle from the hot mechanical tap during the Shabbat operational mode.

In some embodiments, method 100 further comprises step 116 of draining the residual water which remains in the Shabbat hot water dispensing nozzle during the Shabbat operational mode. In some examples, step 116 is achievable by connecting the Shabbat hot water dispensing nozzle to a ventilation unit.

In some preferred embodiments, method 100 further comprises step 118 of delaying or suspending the refilling or replenishment of the water in hot water reservoir, during the daily operational mode. During the daily operational mode, electric inlet valve used to replenish water reservoir 22, from an inlet, such as inlet/outlet 24, shown in FIG. 3. During the daily operational mode, electric inlet valve used to replenish water in hot water reservoir 22 is actuated according in accordance with the level monitoring device in water reservoir 22, when the level of water in hot water reservoir 22 drops blow a predefined level. In some preferred embodiments, replenishment of water in the hot water reservoir 22 at step 118 is delayed or suspended. During step 118 when accordance with the level monitoring device the level of water in hot water reservoir 22 drops blow a predefined level, hot water reservoir 22 is not replenished immediately but rather a delay of a preset period of time firstly passes, before hot water reservoir 22 is replenished. The preset period of time optionally ranges between a 1 or 2 minutes and up to 10 or 15 minutes. Delaying or suspending the replenishment of water in the hot water reservoir 22 at step 118 facilitates non-dilution of hot water, when several portions of hot water are dispensed from the water dispensing appliance in a relatively short period of time.

In some preferred embodiments, method 100 further comprises step 120 of operating the water dispensing appliance in a non-Sabbath Jewish holidays operational mode, where some of the functionalities of the daily operational mode are disabled, whereas some of the functionalities of the Sabbath operational mode are permitted. For instance during a non-Sabbath Jewish holidays mode, the actuation of electrical devices is forbidden and therefore the eclectic taps are disabled and the dispensing of water is possible only via the mechanical taps.

However during a non-Sabbath Jewish holidays mode the heating of water may be permissible and therefore an inlet valve, such as float valve 40, operable to control the flow of water from water inlet 46, is optionally remains active. During a non-Sabbath Jewish holidays mode the heating of water may be permissible and therefore an electric inlet valve, such as electric inlet valve used to replenish water reservoir 22, at step 122, from an inlet, such as inlet/outlet 24, shown in FIG. 3, is optionally actuated according to preset time intervals and regardless of the level monitoring device in water reservoir 22.

In some embodiments, the controller module which commands operation of the various electrical components of water dispensing appliance 10 during the daily operational mode and optionally also during the Sabbath operational mode, comprises a communication module, such as an IoT device. The communication module of the controller module configured to receive messages including operational instructions and updates thereof, for example the timing of Sabbath operational mode onset and/or offset as well as the timing of non-Sabbath Jewish holidays operational mode onset and/or offset.

Figure 9:
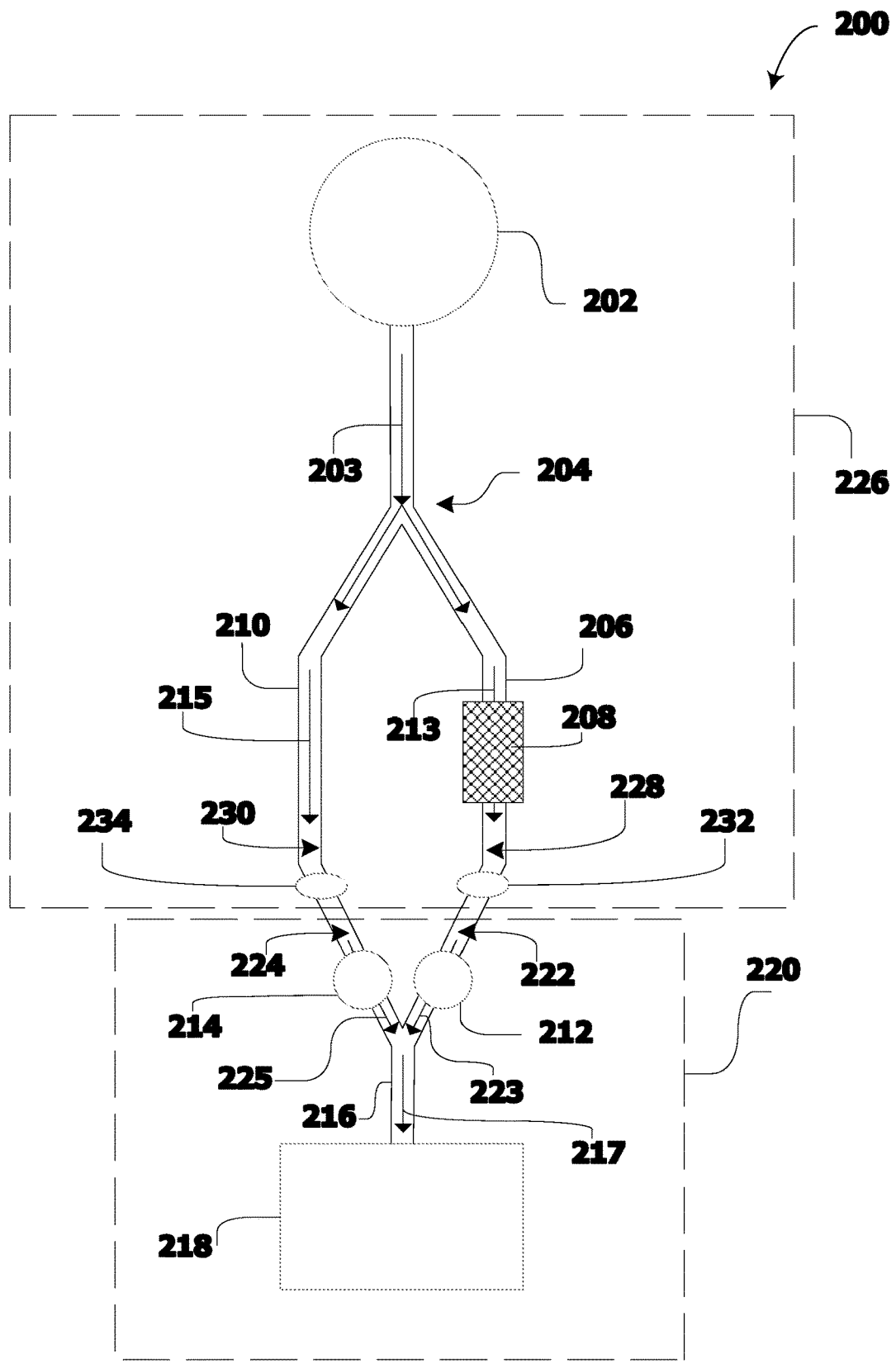
FIG. 9 is a schematic block diagram of the system for controlled water filtering, according to some embodiments of the present invention.

In accordance with some preferred embodiments of the present invention, reference is now made to FIG. 9, showing system 200 for controlled water filtering. In some embodiments, system 200 comprises water inlet 202. FIG. 9 illustrates an embodiment of the invention. System 200 for controlled water filtering of the embodiment of FIG. 9 illustrates various features that may be interchangeable with elements of any other embodiment described in the specification. System 200 for controlled water filtering of the embodiment of FIG. 9 includes various features and elements of water dispensing appliance 10 shown in FIG. 1 to 5, such as shared controller, power supply, communication, operational computer memory and etc.

Water inlet 202 is configured for connection to an outlet of and supplying water from, typically a domestic water grid in the direction of arrow 203. In some embodiments, system 200 further comprises bifurcator 204. Bifurcator 204 is operationally connected to water inlet 202. Bifurcator 204 is configured for bifurcating a flow of water incoming from inlet 202.

In some embodiments, system 200 further comprises filter branch pipe 206. Filter branch pipe 206 is configured for collecting unfiltered water from inlet 202. Filter branch pipe 206 is operationally connected to bifurcator 204. Filter branch pipe 206 comprises at least one filtering device 208 configured for filtering water passing therethrough and producing filtered water and/or filtrate.

In some embodiments, filtered water and/or filtrate includes distilled water is generated by vacuum distillation, boiling of water and collecting the water vapor or by multistage flash distillation, whereas in other examples distilled water is generated by reverse osmosis processes. In other embodiments, distilled water by reverse osmosis, implementing pressure and/or semipermeable membranes, in order to remove salt and/or minerals and/or other impurities therefrom. As described above, distilled water is typically pressurized.

In some embodiments, system 200 further comprises bypass branch pipe 210. Bypass branch pipe 210 is operationally connected to bifurcator 204. Bypass branch pipe 210 is configured for collecting unfiltered water from inlet 202 and supplying unfiltered water downstream to filtering device 208, without filtering it.

In some embodiments, system 200 further comprises filtered water valve 212. Filtered water valve 212 is operationally connected to filter branch pipe 206. Filtered water valve 212 is configured to control a flow of the filtered water through filtering device 208 in the direction of arrow 213.

In some embodiments, system 200 further comprises bypass valve 214. Bypass valve 214 is operationally connected to bypass branch pipe 210. Bypass valve 214 is configured to control the flow of the unfiltered water through bypass branch pipe 210.

In some embodiments, system 200 comprises a controller, typically including a PCB and microprocessor. The controller comprises a filtering control unit, configured for controlling the flow of the filtered water through filtering device 208, according to deterministic rules and/or prescheduled time schedule. In some embodiments, the controller comprises a bypass control unit, configured for controlling the flow of the unfiltered water through bypass branch pipe 210, according to deterministic rules and/or prescheduled time schedule.

In some embodiments, a controller module commands operation of the various electrical components of system 200 during both the daily operational mode and the Sabbath operational mode. In some embodiments, a selectable mechanism, such is in a form of a switch or button, is provided so as to activate the Sabbath mode, preventing water from passing through filter branch pipe 206 during the Sabbath. When the selectable mechanism is actuated, passing of water through filter branch pipe 206 is prevented by, for example, by closing filtered water valve 212 and opening bypass valve 214.

In some examples, filtered water valve 212 and bypass valve 214 are separate electromechanical valves. In some examples, filtered water valve 212 and bypass valve 214 are a single combined device, such as solenoid activated diaphragm valve, which upon changing the state, concomitantly opens filtered water valve 212 and closes bypass valve 214 or alternatively closes filtered water valve 212 and opens bypass valve 214.

In some embodiments, system 200 further comprises junction element 216. Junction element 216 is disposed downstream to filter branch pipe 206 and bypass branch pipe 210. Junction element 216 is configured for combining the flow of the filtered water from filter branch pipe 206 and the flow of the unfiltered water from bypass branch pipe 210 in the direction of arrow 217.

In some examples, junction element 216 is configured for draining the flow of the filtered water from filter branch pipe 206 and/or the flow of the unfiltered water from bypass branch pipe during a daily operational mode, by controllably opening and/or closing filtered water valve 212 and closing and/or opening bypass valve 214. In other examples, junction element 216 is configured for draining the flow of the unfiltered water from bypass branch pipe 210 during a Shabbat operational mode, by controllably closing filtered water valve 212 and opening bypass valve 214.

In some embodiments, system 200 further comprises water dispensing appliance 218. Water dispensing appliance 218 is operationally connected to junction element 216. Water dispensing appliance 218 is configured to controllably dispense a flow of water from junction element 216. In some embodiments, water dispensing appliance 218 comprises a plurality of water dispensing nozzles and/or a plurality of water outlets from the not and/or cold water reservoirs water dispensing appliance 218, configured for dispensing filtered and/or unfiltered hot water, filtered and/or unfiltered cold water during the daily operational mode and/or Shabbat operational mode.

In some embodiments, dispensing appliance 218 of system 200 is essentially similar to water dispensing appliance 10 shown in FIG. 1 to 5. In some embodiments, the hot water reservoir of dispensing appliance 218 of system 200 comprises a first outlet. The first outlet operationally connects the hot water reservoir to a hot water mechanical tap operational during the Shabbat operational mode. The first outlet is disposed inasmuch closer to the hot water mechanical tap, so that the conduit conducting hot water from the hot water reservoir to the mechanical tap is inasmuch sorter, whereby inasmuch minuscular amounts of residual water remain outside the hot water reservoir in the conduit between the first outlet and the mechanical tap, during the Shabbat operational mode, thereby maintaining essentially the same temperature between the hot water reservoir and the hot water mechanical tap. Short connection and dedicated conduit, from the hot reservoir to the mechanical tap facilitates the maintaining of essentially the same temperature of the residual water in the conduit as in the hot reservoir.

In some embodiments, the hot water subsystem of dispensing appliance 218 of system 200 further comprises a Shabbat hot water dispensing nozzle. The Shabbat hot water dispensing nozzle is operationally connected to the first outlet by a tube or pipe. The Shabbat hot water dispensing nozzle is configured for dispensing hot water from the hot water mechanical tap, during the Shabbat operational mode. In some embodiments, the Shabbat hot water dispensing nozzle includes a first hot water inlet configured to conduct hot water from the hot water mechanical tap to the Shabbat hot water dispensing nozzle.

In some embodiments, the hot water subsystem of dispensing appliance 218 of system 200 further comprises a second outlet, such as outlet 26B, shown in FIG. 3. The second outlet is operationally connected to the hot water reservoir. The second outlet is configured for releasing hot water from the hot water reservoir to the hot water electrical tap, operable during the daily operational mode.

In some embodiments, the hot water subsystem of dispensing appliance 218 of system 200 further comprises a daily hot water dispensing nozzle. The inlet of the daily hot water dispensing nozzle is operationally connected to hot water electrical tap, via a pipe or tube. The daily hot water dispensing nozzle is configured for dispensing hot water from the hot water electrical tap, during the daily operational mode. In some embodiments, the hot water subsystem of dispensing appliance 218 of system 200 includes a second hot water inlet configured to conduct hot water from the hot water electrical tap, to the daily hot water dispensing nozzle.

In some embodiments, the daily hot water dispensing nozzle, which is connected to the second outlet of the hot water reservoir, via the hot water electrical tap, is typically intended for dispensing hot water via the hot water electrical tap, during the daily operational mode. During the daily operational mode, the excess hot water present in the daily hot water dispensing nozzle after closing the hot water electrical tap can be cooled because cooking is not prohibited during the week.

In accordance with another preferred embodiment of the present invention, system 200 for controlled water filtering comprises water dispensing subsystem 220. Water dispensing subsystem 220 is configured to controllably dispense a flow of water therefrom. In some embodiments, dispensing subsystem 220 of system 200 is essentially similar to water dispensing appliance 10 shown in FIG. 1 to 5.

In some embodiments, water dispensing subsystem 220 comprises filtered water inlet 222 and unfiltered water inlet 224. In some embodiments, water dispensing subsystem 220 further comprises filtered water valve 212. Filtered water valve 212 is operationally connected to filtered water inlet 222, configured to control a flow of filtered water therethrough in the direction of arrow 223.

In some embodiments, water dispensing subsystem 220 further includes bypass valve 214. Bypass valve 214 is operationally connected to unfiltered water inlet 224, configured to control a flow of unfiltered water therethrough in the direction of arrow 225.

In some embodiments, water dispensing subsystem 220 further comprises junction element 216. Junction element 216 is operationally connected to filtered water valve 212 and bypass valve 214. Junction element 216 is configured for combining a flow of filtered water from filtered water valve 212 and a flow of unfiltered water from bypass valve 214 in the direction of arrow 217.

In some embodiments, system 200 comprises water filtering subsystem 226. Water filtering subsystem 226 comprises water inlet 202. In some embodiments, water filtering subsystem 226 further comprises bifurcator 204, operationally connected to water inlet 202, configured for bifurcating a flow of the water from inlet 202 in the direction of arrow 203. In some embodiments, water filtering subsystem 226 of system 200 comprises filter branch pipe 206 comprising at least one filtering device 208 and bypass branch pipe 210 configured for collecting unfiltered water from inlet 202.

In some embodiments, water filtering subsystem 226 of system 200 further comprises filtered water outlet 228 and unfiltered water outlet 230. In some embodiments, water filtering subsystem 226 further comprises filtered water connector 232. Filtered water connector 232 is configured to operationally connect filtered water outlet 228 of said water filtering subsystem 226 to filtered water inlet 222 of water dispensing subsystem 220.

In some embodiments, water filtering subsystem 226 of system 200 further comprises unfiltered water connector 234. Unfiltered water connector 234 is configured to operationally connect unfiltered water outlet 230 of water filtering subsystem 226 to unfiltered water inlet 224 of water dispensing subsystem 220.

According to some embodiments and aspects of the present invention, water filtering subsystem 226 of system 200 comprises filtered water connector 232 and unfiltered water connector 234 readily connectable to unfiltered water outlet 230 of water filtering subsystem 226 to unfiltered water inlet 224 of water dispensing subsystem 220.

According to some embodiments and aspects of the present invention, water filtering subsystem 226 of system 200 further comprises an electrical connector readily connectable to a power source and/or an electrical connector readily connectable to a power consumer and/or an electrical connector readily connectable to water dispensing subsystem 220.

According to some embodiments and aspects of the present invention, the connectors are of at least one type selected from the group consisting of: a rapid type connector, instant type connector, plug-in type connector and push-in type connector.

Figure 10:
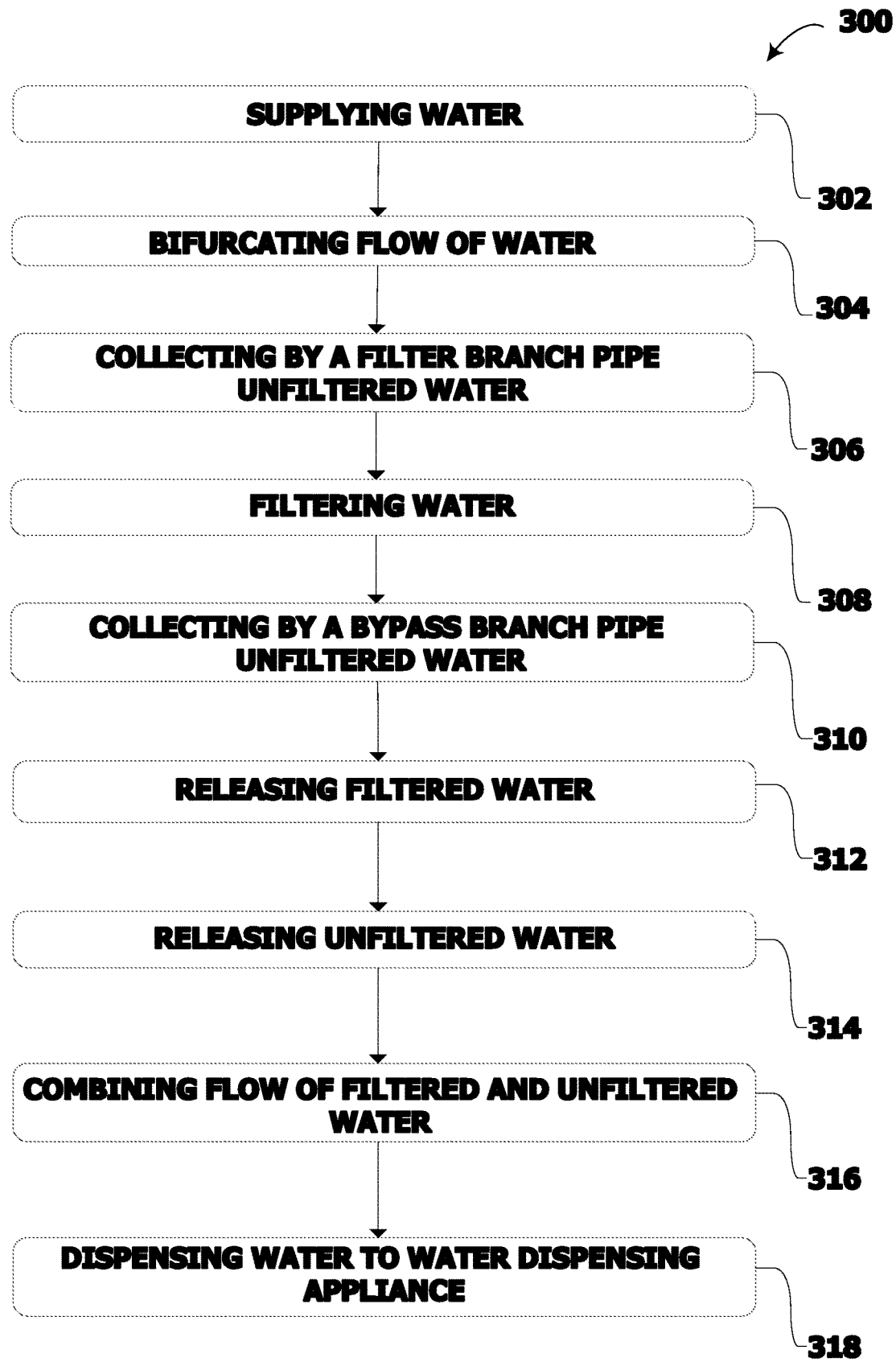
FIG. 10 is a flowchart of the method for controlled water filtering, according to some embodiments of the present invention.

In accordance with some preferred embodiments, reference is now made to FIG. 10, showing flowchart of method 300 for controlled water filtering. The embodiment of method 300 shown in FIG. 10 illustrates various features that may be interchangeable with elements and/or features of any other embodiment described in the specification.

In some embodiments, method 300 commences at step 302 of supplying water from a grid to a water inlet. In some embodiments, method 300 comprises step 304 of bifurcating the flow of the water received from the inlet.

In some embodiments, method 300 further comprises step 306 of collecting by a filter branch pipe unfiltered water from the inlet. In some embodiments, method 300 further includes step 308 of filtering water passing through the filter branch pipe by at least one filtering device.

In some embodiments, method 300 further comprises step 310 of collecting by a bypass branch pipe unfiltered water from the inlet. Step 310 comprises bypassing at least one filtering device of the filter branch pipe.

In some embodiments, method 300 further includes step 312 of releasing the filtered water from a filtered water valve. In some embodiments, method 300 further includes step 314 of releasing the unfiltered water from a bypass valve.

In some embodiments, method 300 further comprises step 316 of combining by a junction element the flow of the filtered water from the filter branch pipe and the flow of the unfiltered water from the bypass branch pipe. Step 316 is achievable by combining the opening of the filtered water valve and the opening of the bypass valve.

In some preferred embodiment, method 300 further comprises a step of draining via the junction element the flow of the filtered water from the filter branch pipe, by controllably opening the filtered water valve and closing the bypass valve, typically implemented during the daily mode. In some preferred embodiments, method 300 further comprises a step of draining via the junction element the flow of the unfiltered water from the bypass branch pipe, by controllably closing the filtered water valve and opening the bypass valve, typically implemented in the Shabbat mode.

In some embodiments, method 300 further comprises step 318 of conducting a flow of water from the junction element to a water dispensing appliance.

Figure 11:
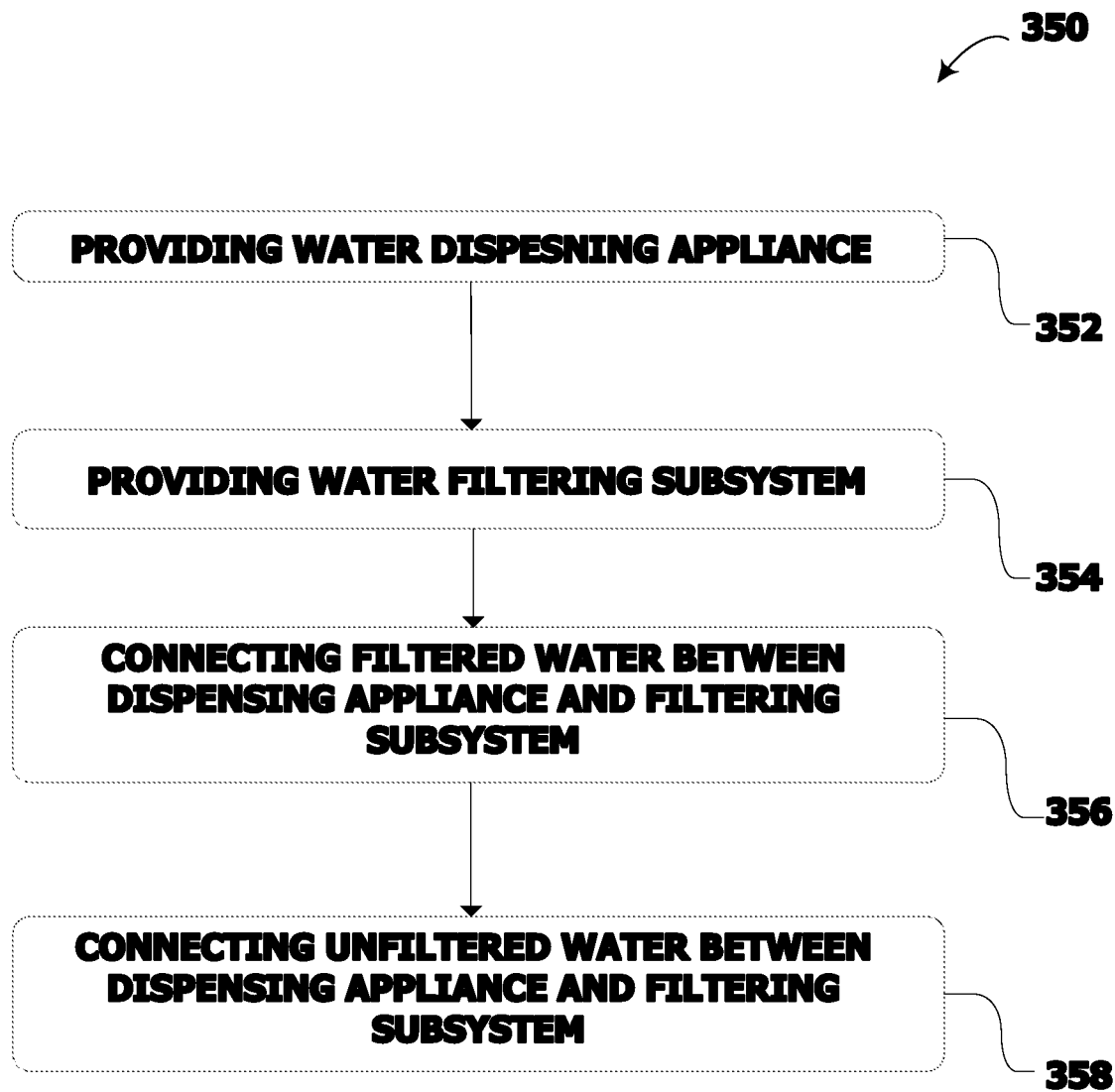
FIG. 11 is a flowchart of the method for controlled water filtering, according to another embodiment of the present invention.

In accordance with another embodiment of the present invention, reference is now made to FIG. 11, showing flowchart of method 350 for controlled water filtering. The embodiment of method 350 shown in FIG. 11 illustrates various features that may be interchangeable with elements and/or features of any other embodiment described in the specification.

In some embodiments, method 350 comprises step 352 of providing a water dispensing appliance configured to controllably dispense a flow of water therefrom. In some embodiments, the water dispensing appliance comprises a filtered water inlet as filtered water inlet as well as an unfiltered water inlet, such as filtered water inlet 222 and unfiltered water inlet as water inlet 224 shown in FIG. 9. In some embodiments, the water dispensing appliance or subsystem comprises a bypass valve, configured to control a flow of unfiltered water therethrough, a filtered water valve, configured to control a flow of filtered water therethrough, and a junction element configured for combining a flow of filtered water from the filtered water valve and a flow of unfiltered water from the bypass valve, such as filtered water valve 212, bypass valve 214 and junction element 216 shown in FIG. 9.

In some embodiments, the water filtering subsystem comprises a bypass valve, configured to control a flow of unfiltered water therethrough, a filtered water valve, configured to control a flow of filtered water therethrough, and a junction element configured for combining a flow of filtered water from the filtered water valve and a flow of unfiltered water from the bypass valve, such as filtered water valve 212, bypass valve 214 and junction element 216 shown in FIG. 9.

In some embodiments, method 350 further comprises step 354 of providing a water filtering subsystem. In some embodiments, the water filtering subsystem comprises: a water inlet configured for supplying water from a grid, a bifurcator configured for bifurcating the flow of water received from the inlet, a filtered water outlet and an unfiltered water outlet, such as water inlet 224, bifurcator 204, filtered water outlet 228 and unfiltered water outlet 230 shown in FIG. 9.

In some embodiments, method 350 further includes step 356 of connecting, via a filtered water connector, the filtered water outlet of the water filtering subsystem to the filtered water inlet of the water dispensing subsystem. In some embodiments, method 350 further includes step 358 of connecting, via an unfiltered water connector, the unfiltered water outlet of the water filtering subsystem to the unfiltered water inlet of the water dispensing appliance.

Figure 12:
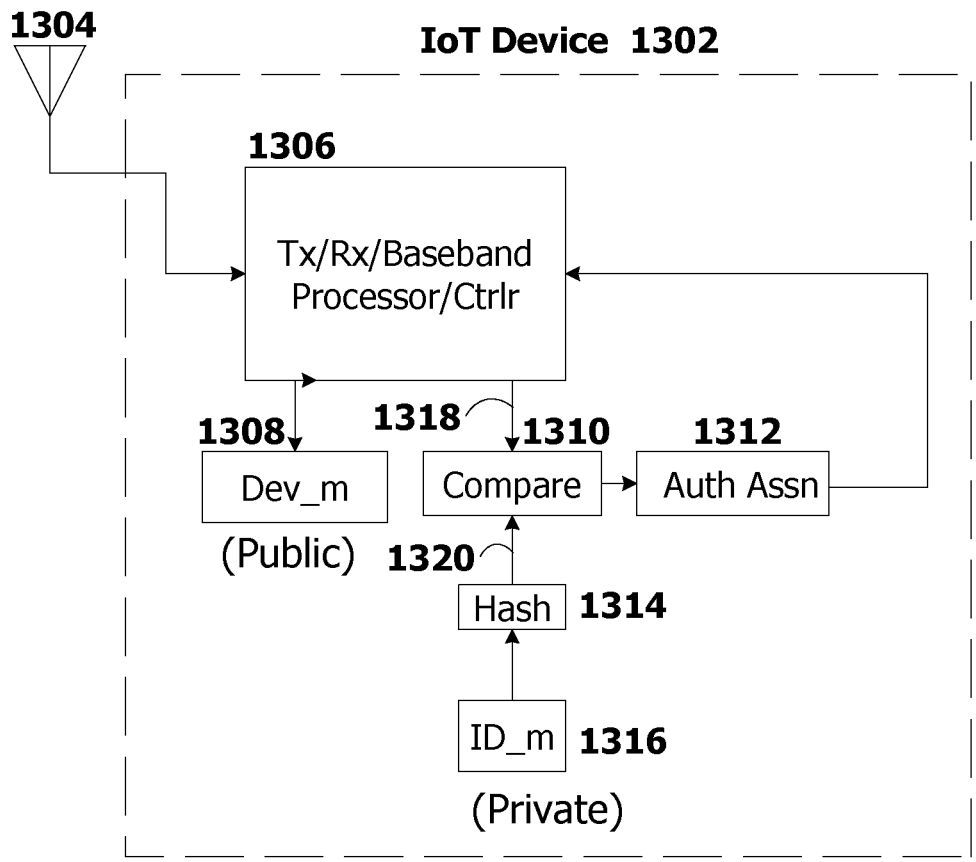
FIG. 12 is a schematic diagram of an exemplary IoT device.

Reference is now made to FIG. 12 shows an exemplary IoT device 1302 which includes an antenna 1304 for communication with antennas and propagation [AP](not shown). Exemplary IoT device 1302 shown in FIG. 12 is configured to receive messages, preferably in an encrypted form. A controller 1306 of exemplary IoT device 1302, which includes: a transmitter, receiver and baseband processor, is coupled to the antenna and is operative to execute protocols.

The controller 1306 is coupled to a public identifier Dev_m 1308, which is accessible directly to the controller 1306, and may include information printed on the IoT device 1302, or is transmitted by the IoT device, such as a registration request. The private identifier ID_m 1316 is not publicly accessible. In one example shown in FIG. 11, the private ID_m 1316 may be hashed 1314 using a Secure Hash Algorithm (SHA), such as the SHA-2 as published by the National Institute of Standards and Technology (NIST) and described in U.S. Pat. No. 6,829,355.

An incoming registration acknowledgement which includes a secure ID_m as a hash may be compared 1318 to generate an authorization for association 1312 to the controller 1306. Alternatively, the ID_m 1316 may be directly coupled to the controller 1306, which decrypts an incoming registration acknowledgement and the decrypted received ID_m from a message may be directly compared to the ID_m 1316 which is unique to the IoT device 1302 and not directly accessible from an external query.

Figure 13:
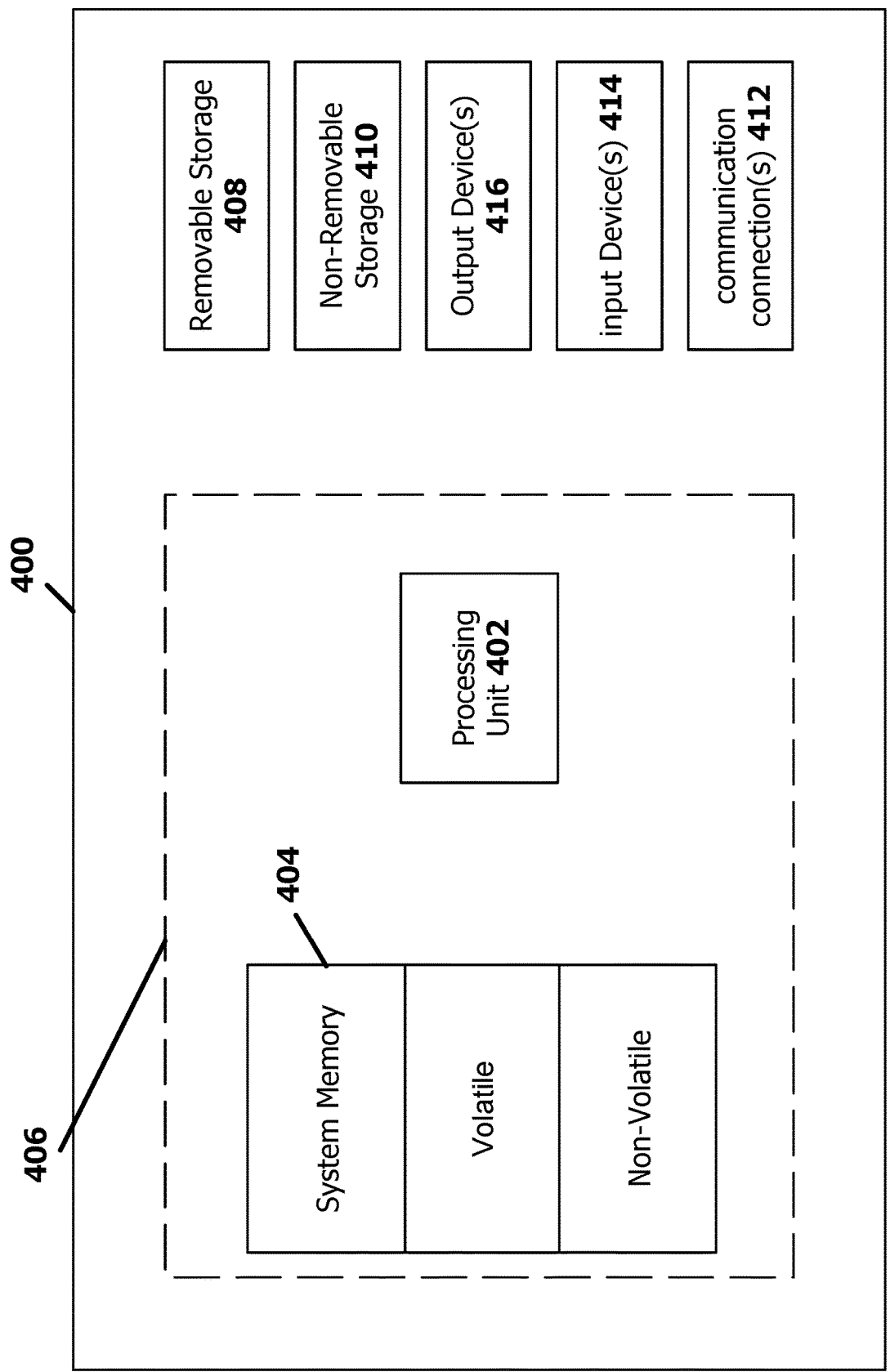
FIG. 13 is a schematic diagram of an exemplary computing environment.

With reference to FIG. 13, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 13 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 13 by removable storage 408 and non-removable storage 410.

Computing device 400 typically includes a variety of computer readable media. Computer readable media can be any available media that can be accessed by computing device 400 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

It will be appreciated by persons skilled in the art that the present invention is not limited by what has been particularly shown and described herein above. Rather the scope of the invention is defined by the claims which follow:

The invention claimed is:
1. A system for controlled water filtering comprising:
a water inlet configured for supplying water from a grid;
a bifurcator operationally connected to said water inlet, configured for bifurcating a flow of said water from said water inlet, comprising:
bifurcating a flow of said water from said water inlet, comprising:
(I) a filter branch pipe configured for collecting unfiltered water from said water inlet;
(II) a bypass branch pipe configured for collecting said unfiltered water from said water inlet;
at least one filtering device, disposed on said filter branch pipe, configured for filtering said water passing therethrough and thereby generating filtered water;
a filtered water valve, operationally connected to said filter branch pipe, configured for controlling a flow of said filtered water through said at least one filtering device;
a bypass valve operationally connected to said bypass branch pipe, configured for controlling a flow of said unfiltered water through said bypass branch pipe;
a junction element disposed downstream to said filter branch pipe and said bypass branch pipe, configured for combining said flow of said filtered water from said filter branch pipe and said flow of said unfiltered water from said bypass branch pipe, thereby producing an outflow of said filtered water or said unfiltered water;

a water dispensing appliance operationally connectable to said junction element, configured to controllably dispense said outflow of said filtered water or said unfiltered water received from said junction element; and wherein said junction element, disposed downstream to said filter branch pipe and said bypass branch pipe, is configured for draining said flow of said filtered water from said filter branch pipe, by controllably opening said filtered water valve and closing said bypass valve.

2. The system, as in claim 1, wherein said junction element, disposed downstream to said filter branch pipe and said bypass branch pipe, is configured for draining said flow of said unfiltered water from said bypass branch pipe, by controllably closing said filtered water valve and opening said bypass valve.

3. The system, as in claim 1, wherein said water dispensing appliance comprises at least one nozzle selected from the group consisting of: a daily hot water dispensing nozzle, Shabbat hot water dispensing nozzle and cold water dispensing nozzle.

4. The system, as in claim 3, wherein said cold water dispensing nozzle further comprising a ventilation unit, configured for draining residual water from said cold water dispensing nozzle, downstream to a cold water mechanical tap.

5. The system, as in claim 3, wherein said cold water dispensing nozzle further comprising a daily cold water dispensing nozzle, downstream to a cold water electrical tap, and a Shabbat cold water dispensing nozzle, downstream to a cold water mechanical tap.

6. The system, as in claim 1, further comprises a controller comprising:
a filtering control unit, configured for controlling said flow of said filtered water through said at least one filtering device;
a bypass control unit, configured for controlling said flow of said unfiltered water through said bypass branch pipe.

7. The system, as in claim 1, wherein said filtered water valve and said bypass valve are electromechanical valves.

8. The system, as in claim 1, wherein said filtered water valve and said bypass valve are functionally actuated by a switch.

9. A system for controlled water filtering comprising:
a water dispensing appliance, configured to controllably dispense a flow of water therefrom, comprising:
(I) a filtered water inlet;
(II) an unfiltered water inlet;
(III) a junction element operationally connected to a filtered water valve and a bypass valve, configured for combining a flow of filtered water from said filtered water valve and a flow of unfiltered water from said bypass valve;
a water filtering subsystem comprising:
(IV) a grid water inlet configured for supplying said water from a grid;
(V) a bifurcator operationally connected to said water inlet, configured for bifurcating a flow of water from said water inlet, comprising:
(i) a filter branch pipe comprising at least one filtering device configured for filtering said water passing therethrough, said filter branch pipe is configured for collecting d unfiltered water from said water inlet;
(ii) a bypass branch pipe configured for collecting d unfiltered water from said water inlet;

(VI) said filtered water valve, operationally connected to said filtered water inlet, configured to control a flow of said filtered water therethrough;
(VII) a bypass valve, operationally connected to said unfiltered water inlet, configured to control a flow of said unfiltered water therethrough;
(VIII) a filtered water outlet;
(IX) an unfiltered water outlet;
a filtered water connector, configured to operationally connect said filtered water outlet of said water filtering subsystem to said filtered water inlet of said water dispensing appliance;
an unfiltered water connector, configured to operationally connect said unfiltered water outlet of said water filtering subsystem to said unfiltered water inlet of said water dispensing appliance,
wherein said junction element, disposed downstream to said filter branch pipe and said bypass branch pipe, is configured for draining said flow of said filtered water from said filter branch pipe, by controllably opening said filtered water valve and closing said bypass valve.

10. The system, as in claim 9, wherein said junction element, disposed downstream to said filter branch pipe and said bypass branch pipe, is configured for draining said flow of said unfiltered water from said bypass branch pipe, by controllably closing said filtered water valve and opening said bypass valve.

11. The system, as in claim 9, wherein said water dispensing appliance comprises at least one nozzle selected from the group consisting of: a daily hot water dispensing nozzle, Shabbat hot water dispensing nozzle and cold water dispensing nozzle.

12. The system, as in claim 9, further comprising a controller comprising:
a filtering control unit, configured for controlling said flow of said filtered water through said at least one filtering device;
a bypass control unit, configured for controlling said flow of said unfiltered water through said bypass branch pipe.

13. The system, as in claim 9, wherein said filtered water valve and said bypass valve are electromechanical valves.

14. A method for controlled water filtering comprising:
supplying water from a grid to a water inlet;
bifurcating a flow of said water from said water inlet;
collecting by a filter branch pipe unfiltered water from said water inlet;
filtering water passing through said filter branch pipe by at least one filtering device;
collecting by a bypass branch pipe said unfiltered water from said water inlet;
bypassing said at least one filtering device of said filter branch pipe;
releasing said filtered water from a filtered water valve;
releasing said unfiltered water from a bypass valve;
combining by a junction element said flow of said filtered water from said filter branch pipe and said flow of said unfiltered water from said bypass branch pipe;
dispensing a flow of water from said junction element to a water dispensing appliance, wherein said junction element, disposed downstream to said filter branch pipe and said bypass branch pipe, is configured for draining said flow of said filtered water from said filter branch pipe, by controllably opening said filtered water valve and closing said bypass valve.

15. The method, as in claim 14, wherein said combining by said junction element said flow of said filtered water from said filter branch pipe and said flow of said unfiltered water from said bypass branch pipe, further comprises combining openings of said filtered water valve and said bypass valve.

16. The method, as in claim 14, further comprising supplying by said junction element said flow of said filtered water from said filter branch pipe by controllably opening said filtered water valve and closing said bypass valve.

17. The method, as in claim 14, further comprising supplying by said junction element said flow of said unfiltered water from said bypass branch pipe by controllably closing said filtered water valve and opening said bypass valve.

18. The method, as in claim 14, further comprising:
controlling by a filtering control unit said flow of said filtered water through said at least one filtering device;
controlling by a bypass control unit said flow of said unfiltered water through said bypass branch pipe.

19. A method for controlled water filtering comprising:
providing a water dispensing appliance configured to controllably dispense a flow of water therefrom, comprising:
(I) a filtered water inlet;
(II) an unfiltered water inlet;
(III) a filtered water valve, operationally connected to said filtered water inlet, configured to control a flow of filtered water therethrough;
providing a water filtering subsystem, comprising:
(IV) a water inlet configured for supplying said water from a grid;
(V) a bifurcator operationally connected to said water inlet, configured for bifurcating a flow of said water from said water inlet, comprising:
(i) a filter branch pipe comprising at least one filtering device configured for filtering said water passing therethrough, said filter branch pipe is configured for collecting unfiltered water from said inlet;
(ii) a bypass branch pipe configured for collecting said unfiltered water from said unfiltered water inlet;
(VI) a bypass valve, operationally connected to said unfiltered water inlet, configured to control a flow of said unfiltered water therethrough;
(VII) a junction element operationally connected to said filtered water valve and a bypass valve, configured for combining a flow of said filtered water from said filtered water valve and a flow of said unfiltered water from bypass valve;
(Vlll) a filtered water outlet;
(IX) an unfiltered water outlet;
connecting by a filtered water connector said filtered water outlet of said water filtering subsystem to said filtered water inlet of said water dispensing appliance;
connecting by an unfiltered water connector said unfiltered water outlet of said water filtering subsystem to said unfiltered water inlet of said water dispensing appliance, and
further comprising draining by said junction element said flow of said filtered water from said filter branch pipe by controllably opening said filtered water valve and closing said bypass valve.

20. The method, as in claim 19, wherein said combining by said junction element said flow of said filtered water from said filter branch pipe and said flow of said unfiltered water from said bypass branch pipe, further comprises combining openings of said filtered water valve and said bypass valve.

21. The method, as in claim 19, further comprising draining by said junction element said flow of said unfiltered water from said bypass branch pipe by controllably closing said unfiltered water valve and opening said bypass valve.

22. The method, as in claim 19, further comprising:
controlling by a filtering control unit said flow of said filtered water through said at least one filtering device;
controlling by a bypass control unit said flow of said unfiltered water through said bypass branch pipe.

* * * * *